US010885278B2

(12) United States Patent
Lam et al.

(10) Patent No.: US 10,885,278 B2
(45) Date of Patent: Jan. 5, 2021

(54) AUTO TELE-INTERVIEW SOLUTION

(71) Applicant: ROYAL BANK OF CANADA, Montreal (CA)

(72) Inventors: Chai K. Lam, Toronto (CA); Xuong Hue Tran, Toronto (CA); Kulbinder Mann, Toronto (CA); Lori May Beesack, Toronto (CA); Edward C. Wong, Toronto (CA)

(73) Assignee: ROYAL BANK OF CANADA, Toronto (CA)

(*) Notice: Subject to any disclaimer, the term of this patent is extended or adjusted under 35 U.S.C. 154(b) by 156 days.

(21) Appl. No.: 16/163,212

(22) Filed: Oct. 17, 2018

(65) Prior Publication Data

US 2019/0114321 A1 Apr. 18, 2019

Related U.S. Application Data

(60) Provisional application No. 62/573,203, filed on Oct. 17, 2017.

(51) Int. Cl.
*G06F 40/30* (2020.01)
*G06Q 10/10* (2012.01)
(Continued)

(52) U.S. Cl.
CPC .......... *G06F 40/30* (2020.01); *G06F 16/2246* (2019.01); *G06F 16/24522* (2019.01);
(Continued)

(58) Field of Classification Search
CPC ........ G10L 40/30; G10L 40/00; G10L 40/10; G10L 40/137; G10L 40/14; G10L 40/20; G10L 40/205; G10L 40/216; G10L 40/35; G06F 40/30; G06F 40/00; G06F 40/10; G06F 40/137; G06F 40/14; G06F 40/20; G06F 40/205; G06F 40/216; G06F 40/35
(Continued)

(56) References Cited

U.S. PATENT DOCUMENTS

| 6,061,472 A * | 5/2000 | Hullender .......... G06K 9/00416 |
| | | 382/187 |
| 2004/0029093 A1 * | 2/2004 | Guignard ................. G09B 7/06 |
| | | 434/365 |

(Continued)

*Primary Examiner* — Qi Han
(74) *Attorney, Agent, or Firm* — Norton Rose Fulbright Canada LLP

(57) ABSTRACT

Computer-implemented systems and methods are provided for improved generation and control of conversations. A computing device is utilized to control or simulate conversation using estimated contextual cues extracted from profile information or prior responses. The computing device is configured to automatically tailor a flow of a conversation to an effort to improve relevancy and engagement without the need of a human operator to manually tailor the conversation, which, for example, could be impractically expensive. A structured workflow is maintained in the form of a series of conversation decisions, and a machine learning engine is utilized to maintain a continuously trained data structure that generates predictions that bias conversation decisions (e.g., by weighting tree options) for tailoring the conversation flow.

20 Claims, 15 Drawing Sheets

(51) Int. Cl.
   *G06N 3/08*       (2006.01)
   *G06N 3/04*       (2006.01)
   *G06F 16/22*      (2019.01)
   *G06F 16/2452*    (2019.01)
   *G06F 40/35*      (2020.01)
   *G06F 40/205*     (2020.01)
   *G06F 40/284*     (2020.01)

(52) U.S. Cl.
   CPC .......... *G06F 40/205* (2020.01); *G06F 40/284* (2020.01); *G06F 40/35* (2020.01); *G06N 3/0427* (2013.01); *G06N 3/08* (2013.01); *G06Q 10/1053* (2013.01)

(58) Field of Classification Search
   USPC ...................................... 704/9, 1, 7, 10, 257
   See application file for complete search history.

(56) References Cited

U.S. PATENT DOCUMENTS

2014/0314225 A1* 10/2014 Riahi .................. H04M 3/5183
                                                                      379/265.09
2017/0200128 A1*  7/2017 Kumahara ............. G06Q 50/01
2017/0364857 A1* 12/2017 Suri ................ G06Q 10/06315

\* cited by examiner

AUTO TELE-INTERVIEW SOLUTION

CROSS REFERENCE

This application is a non-provisional of, and claims all benefit, including priority to, Application No. 62/573,203, dated, 17 Oct. 2017, entitled "AUTO TELE-INTERVIEW SOLUTION", incorporated herein by reference in its entirety.

FIELD

Embodiments are directed to automated systems and methods for a chatbot platform, and more specifically to systems and methods for dynamic path adjustment using machine learning.

INTRODUCTION

When responding to automated queries in order to submit biographical, financial, health related, and/or other information as a means of facilitating a risk assessment, applicants often are required to undergo repeated interviews or questionnaires via multiple methods. This repetition of the interview processes is often accompanied by repeated queries seeking information applicants have previously provided during previous steps in the application process. This repetition of queries, as well as sub-optimal, non-adaptive, selection of queries, wastes the time of both the applicant and the interviewer. Static question trees and traversal models lead to non-contextualized questioning, reducing and accuracy of responses, and the lack of awareness as to the circumstances, environment or disposition of the person being interviewed.

For example, individuals applying for life and/or health insurance, depending on the type of insurance product, insured amount, and answers to the pre-qualified questions, may have to go through a telephone interview process with a qualified agent before the application can be approved or declined. Such interviews must be scheduled in advance which adds to the duration of the process depending on the availability of the interviewers. In many cases, the interview can last upwards of 45 minutes. Applicants are required to provide responses to a list of questions that is both static and generic, and which may include many queries that may not be relevant depending on the applicant's answers to previous questions. As a result, such processes, whether automated or manually conducted, produce high numbers of "drop-outs" and customer complaints.

Furthermore, when the call is resumed, there is often a lack of transition and accordingly information needs to be provided again.

There may a need for improved, automated, adaptive, and responsive techniques for producing risk assessment queries, among other discussion workflows.

SUMMARY

A decision tree learning computing approach is described whereby a sequence flow of a series of questions being posed to a user is dynamically modified based on features in the answer response being tracked by a decision tree learning model (e.g., a neural network), the learning approach being utilized to rank a series of potential next questions in the sequence flow to establish a next best question to be posed to the user through the interface. The sequence flow of questions is a represented as a decision tree data structure having multiple junctures which are traversed as questions are answered by the user. The model is trained by establishing a probabilistic ranking (e.g., a suitability score) for each node based on a historical training dataset.

The decision tree network is utilized to contextually derive the next best question based on tracked elements of information collected in real time and may change, for example, based on an environmental context of the user (e.g., type of device being used, bandwidth of network connection), an intent/disposition based score associated with the user (e.g., a detection of annoyance, frustration, or confusion), and known profile information stored in relation to the user (e.g., gender, educational level, language fluency, disabilities).

In particular, a computer system is configured to maintain the network through data structures maintaining one or more interconnected computing units that represent the features being tracked, which include (i) a first set of features representative of one or more observed characteristics of a computing platform or a network connection being used by the user; (ii) a second set of features representative of an estimated current intent e.g. request to pause, mental state or disposition of the user e.g., sentiment; and (iii) a third set of features representative of information retrieved from a stored profile of the user e.g., claim history.

Having the network maintain different sets of features is useful for providing a pause (e.g., suspend and resume) feature whereby a user is able to start an interview or a series of questions in one environment (e.g., mobile in a noisy cafe), and continue the interview or the series of questions in a new environment (e.g., desktop in a quiet office) or switch from a voice mode of communication to a text mode and vice versa. The ability to support multiple modes is enabled by a speech to text and text to speech converter. As noted in some aspects, a recorded snapshot of the feature sets can be recorded for use for providing the pause feature, whereby the snapshot of the feature sets can include only a subset of the available feature sets when the snapshot is taken. When the series of questions are resumed, the network can be provided the subset of recorded features in combination with an updated set of features (e.g., representing that the user has now moved to a desktop in a quiet office), and the next best question can be regenerated using the combined set of recorded features and new features.

The use of a network to dynamically determine the next best question provides technical improvement through heuristically processing known and most recent information dynamically in real time to modify a traversal of a flow of questions, improving a level of flexibility that cannot be practically provided through manual or conventional interactive voice response (IVR) systems.

Accordingly, contextual cues are entered into the neural network, which determines the flow of questions, including, in some embodiments, how questions are presented, how/what information is rendered, and whether additional question junctions are inserted (e.g., due to unsatisfactory answers, or a request to explain the meaning of a medical term) or question junctions are bypassed as questions are deemed irrelevant or already answered based on earlier answers or stored profile data.

In an aspect, a computer system is provided for dynamically determining, from a set of question data objects, a next best question data object for presentment to a user. The computer system includes a first data storage configured to store one or more data structures representative of a model (e.g., neural network) maintaining one or more interconnected computing units representing at least the features being tracked, and a second data storage configured to maintain the stored profile of the user, the profile including at least one or more data fields that are updated as new elements of information are received from the user.

In an embodiment, a processor operates in conjunction with computer memory to train the neural network using a set of training data to establish weighted interconnections between the one or more interconnected computing units, and to monitor observed characteristics of the computing platform or the network connection being used by the user in provisioning of an incoming answer string and update a first set of features based on the one or more observed characteristics.

An incoming answer string from the user is parsed into string tokens, and using a natural language processing engine, the string tokens are parsed to estimate the current intent, mental state or disposition of the user which are used to update the second set of features. Elements of information are extracted from the incoming answer string, and used to update the profile, including the third set of features.

To determine a next best question from a set of candidate next best questions (e.g., questions available at a particular junction of the decision tree being traversed), each question data object from the set of available question data objects is processed through the network to establish a match score for each question data object and the next best question data object is based at least on the match score corresponding to each question data object.

In some embodiments, the set of question data objects are a set of question junctions to be traversed, each having child question data objects which can be selected from by the network. The child question data objects, for example, can represent different types of rendering (e.g., for mobile, for desktop), differing levels of complexity, differing speeds of playback (if audio), and the feature sets are utilized to differentiate between different child question data objects for selection.

The set of question data objects can be represented in a decision tree data structure representing a sequential flow of questions and including variant question data objects available at various junctions of the decision tree data structure. In the context of answering questions, for example, in relation to a health insurance questionnaire, junctions of the decision tree data structure are sequentially traversed and at each junction, the processor determine the next best question data object for presentment to the user. In this example embodiment, this process continues until the decision tree data structure is traversed to a terminal node of the decision tree data structure.

The variant question data objects can include, for example, branch logic or additional sub questions (e.g., breaking up a question into smaller questions), which in some case can cause a rendering of one or more dynamic interface objects for presentment to the user through a user interface, such as a frequently asked question screen, a live agent chat widget, additional explanation pages or word definitions, among others. Branch logic can be utilized to bypass or flag questions for revisiting.

In some embodiments, as questions are answered, the profile associated with the user to incorporate the new elements of information. The processor, in some embodiments, in processing questions posed at a junction to assess the next best question, may determine that all question candidates have low scores. In such an example, the processor may then skip the junction entirely as the question may be irrelevant in view of profile information (e.g., avoiding asking questions about pregnancy to a user who has previously entered male as biological gender).

In some embodiments, the processor is configured to process the incoming answer string to determine a score of the incoming answer string indicative of a level of completeness between the incoming answer string and an underlying question the incoming answer string is being provided as a response. In an alternate embodiment, the processor is configured to transition to a next junction of the decision tree data structure only if the score indicative of the level of completeness is greater than a predefined threshold. In an alternate embodiment, the processor is configured to modify the decision tree data structure to reinsert a junction associated with the underlying question if the level of completeness is less than a predefined threshold, the reinserted junction re-inserted prior to the terminal node of the decision tree data structure.

Computer-implemented systems and methods are provided for improved generation and control of conversations. A computing device is utilized to control or simulate conversation using estimated contextual cues extracted from profile information or prior responses. The computing device is configured to automatically tailor a flow of a conversation to an effort to improve relevancy and engagement without the need of a human operator to manually tailor the conversation, which, for example, could be impractically expensive.

However, the processing of contextual cues can be a challenging technical endeavour. Contextual cues are typically unstructured, and may change from user to user, or from conversation to conversation. The relationships underlying context, while capable of comprehension by humans, are challenging technically to computer-implemented approaches as context consideration cannot be explicitly programmed.

In various embodiments, computer systems including processors in conjunction with memory and data storage are utilized to process the conversations in a structured workflow to derive underlying information by processing through a machine learning engine. Computerized approaches provide benefits in relation to cost of operation, replicability/scalability, depth of learning, among others.

The machine learning engine is configured for processing conversations to derive relationships based on potentially useful a priori information from a counterparty. The conversations are structured such that an application process workflow is undertaken to obtain information. As the conversation proceeds, or based on external information, additional context may be obtained relating to the counterparty, and relationships are dynamically maintained and updated by the machine learning engine.

Over a corpus of events, the machine learning engine may generate one or more predictions that indicate that certain questions may be more relevant or less relevant, or it may be advantageous to ask questions in a particular order or phrase questions in a particular manner, especially given any contextual cues that the machine learning engine has identified, causing the machine learning engine to bias towards one or more conversation decisions (e.g., weighting different nodes of a conversation tree, such that where two or more possible paths are possible, the machine learning engine controls which of the paths to undertake, and any variations thereof). A level of randomization may be implemented so that the process includes some decision entropy that provides information for future decision making.

Accordingly, an automated system is provided that generates control signals that are configured to control a processor or a computing device to tailor a conversational approach such that identified contextual cues may automatically be taken into consideration by the system. Rather than have a human tailor the flow of questions, an automated system provides benefits in relation to cost of operation, replicability/scalability, depth of learning, among others. The automated system includes the machine learning engine, and is utilized in various contexts, such as medical questionnaires, financial risk/portfolio analysis, among others.

Improved informational outcomes are possible, and where there is increased relevancy in questions, the potential "drop off" in answering may be reduced. In accordance with an aspect, there is provided an automated method for data acquisition and underwriting risk analysis, the method comprising: receiving an application for an insurance product from a user; transforming the received application into a computer readable format; processing the transformed application in the computer readable format to determine user information values, and storing the user information values in a client profile; retrieving one or more medical history values from one or more medical information bureau databases, and storing the one or more medical history values in the client profile.

In accordance with an aspect, a computer implemented method for automated data acquisition and underwriting risk analysis is provided, the method comprising: receiving an application for an insurance product from a user; transforming the received application into a computer readable format; processing the transformed application in the computer readable format to determine user information values, and storing the user information values in a client profile; retrieving one or more medical history values from one or more medical information bureau databases, and storing the one or more medical history values in the client profile; transmitting the client profile and the application to a reflexive question engine including a machine learning component configured to continuously maintain a data structure storing weighted conversation pathways; reweighting the weighted conversation pathways of the data structure based at least on the user information values and the stored client profile; analyzing the client profile and the application via the reflexive question engine to determine at least one next relevant question based on a traversal of the data structure and the weighted conversation pathways; transmitting the at least one next relevant question set to the user, and receiving at least one question set response from the user; transforming the received at least one question set response into computer readable format; processing the transformed at least one question set response in the computer readable format to determine a second user information values, and storing the second user information values in the client profile; analyzing the client profile and the application via the reflexive question engine to determine at least one next relevant question, and transmitting the client profile to a data analytics engine; and classifying and scoring the client profile via the data analytics engine to produce an underwriting risk analysis score.

In accordance with an aspect, the automated method for data acquisition and underwriting risk analysis further comprises: transmitting the client profile and the application to a reflexive question engine; analyzing the client profile and the application via the reflexive question engine to determine at least one next relevant question; transmitting the at least one next relevant question set to the user, and receiving at least one question set response from the user; transforming the received at least one question set response into computer readable format; processing the transformed at least one question set response in the computer readable format to determine a second user information values, and storing the second user information values in the client profile.

In accordance with an aspect, the automated method for data acquisition and underwriting risk analysis further comprises: analyzing the client profile and the application via the reflexive question engine to determine at least one next relevant question, and transmitting the client profile to a data analytics engine; and classifying and scoring the client profile via the data analytics engine to produce an underwriting risk analysis score.

In accordance with another aspect, transforming the received application into the computer readable format comprises: receiving one or more historical data values as a recorded audio file via a user input device; transmitting the recorded audio file to a text-to-speech engine; and extrapolating one or more historical data values in the recorded audio file to one or more computer readable data files.

In accordance with another aspect, analyzing the client profile and the application via the reflexive question engine to determine the at least one next relevant question, comprises: determining whether the client profile or the application contains one or more unresponsive user response values; transmitting the one or more unresponsive user response values to a clarification engine; and generating the at least one next relevant question based on the one or more unresponsive user response values.

In accordance with another aspect, the automated method for data acquisition and underwriting risk analysis comprises: retrieving one or more credit history values from one or more credit information bureau databases, and storing the one or more credit history values in the client profile.

In accordance with another aspect, the automated method for data acquisition and underwriting risk analysis comprises: retrieving one or more granular payment behaviour data values from one or more banking history databases, and storing the one or more granular payment behaviour data values in the client profile.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
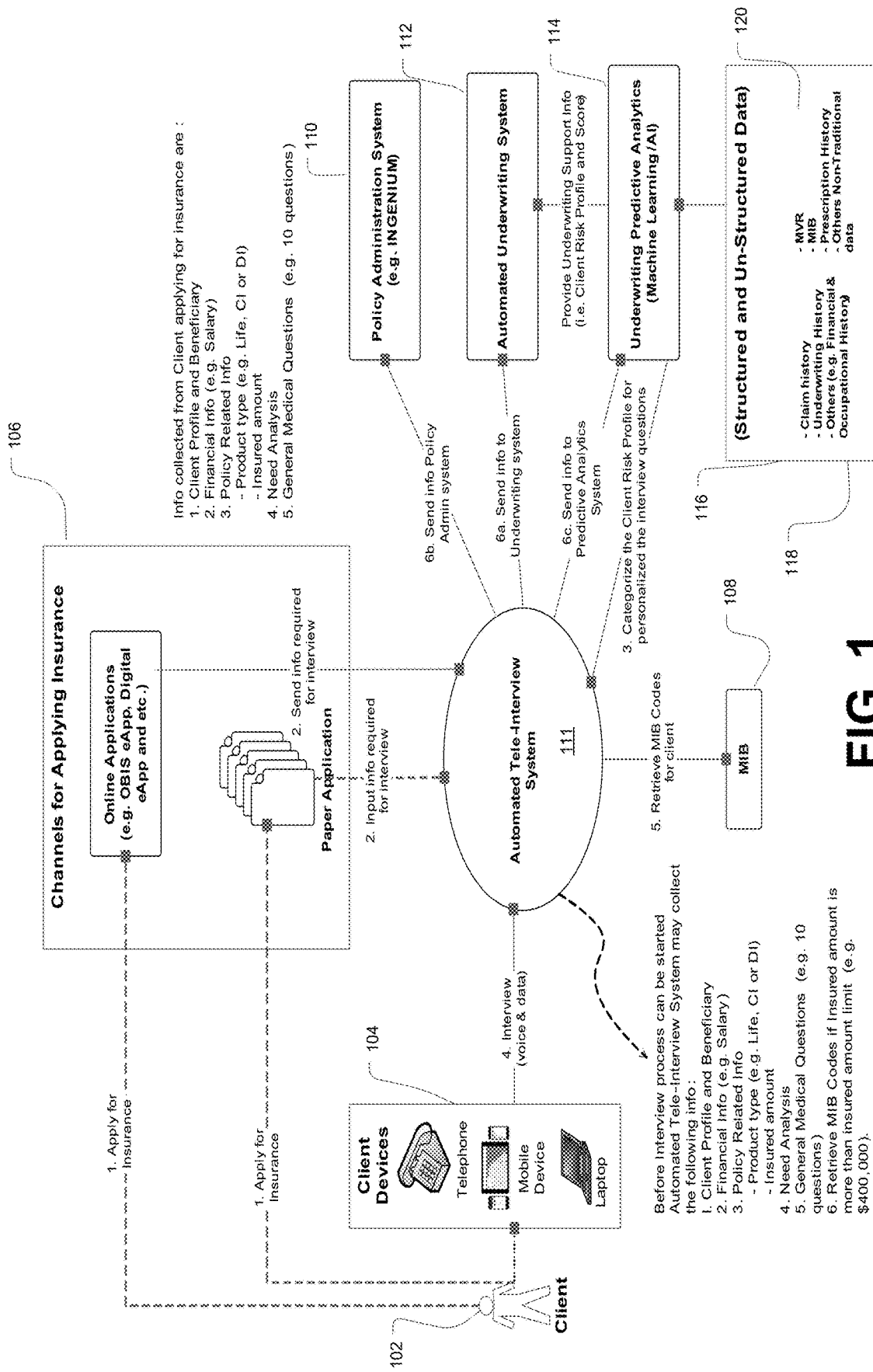
FIG. 1 is a block diagram depicting components of a system as described herein, according to some embodiments.

It is desirable to have users provide answers to various questions, such as in relation to the provisioning of insurance products, surveys, generating requests, etc. The more fulsome and complete the answers are, the more useful the answers are in tailoring a specific product or service to the user.

A challenge with conventional IVR systems is that the flow of questions are typically presented based on hard-coded or inflexible question trees. Manually establishing the linkages and the potential pathways, including the logic behind each decision at each question junction is an impractical and costly approach that may need to be re-designed with every change in the system. Accordingly, a one-size-fits-all solution is often used that leads users to be frustrated, as questions are either tailored without regard to the specific circumstances of the user, repetitive information was requested to be input despite it already being available to the system. Furthermore, it is desirable to have a system where a user is able to start a process, pause the process, and complete the process on different devices or in view of different circumstances.

As described in various embodiments, an improved approach is described whereby a model (e.g., a neural network) is utilized to dictate the series of questions being posed to a user, which map to a sequence flow of questions having various junctions. The neural network is designed to automatically identify a next best question (from a set of candidate variant questions) based on a neural network processing several different feature sets. In the context of pause and resume embodiments, the neural network may be re-run to process the feature sets with one or more feature sets updated based on an updated computing environment of the user (e.g., the process started on mobile and then continued on desktop, or vice versa).

The system can, for example, be implemented as an improved chatbot having a neural network backend, or an improved IVR system having text to speech or vice versa capabilities, and the system can be a decision controller that is configured for use with chatbots or IVR systems to control the presentment of a next best question, or to provide suspend and resume functionality.

The neural network, in some embodiments, can be pre-trained to establish interconnections and weightings thereof between features and questions. The pre-training, for example, can include users providing feedback as to whether a question was appropriate based on the type of device the user was using, the profile characteristics of the user (e.g., English fluency level/medical fluency level), among others. In some embodiments, a feedback process is utilized to re-train the neural network over time depending on an automated analysis of whether the answers to the questions were satisfactory and/or complete relative to the question being posed (or simply skipped). In some further embodiments, users are able to access clarification tools or request clarification, and such inputs are utilized in reducing a suitability level of a particular question in view of the features known about the user.

Accordingly, in some embodiments, reinforcement learning is utilized to re-train the neural network such that the neural network updates itself over time, and is better attuned to asking a "next best question".

A potential advantage of this system is that there is a reduced need to establish manual conditional logic between questions and answers for a question pathway. The system can be provided with a repository of questions and corresponding answers, and required information for one or more forms, and either through pre-training or reinforcement training of the neural network, the neural network automatically establishes next best questions based on generated suitability scores. Accordingly, especially where there are a large number of forms being provisioned into auto-teleinterview forms, the repositories may be simply linked to the neural network to dynamically generate improved decisions for traversing the question decision trees.

In some situations, the system may further transition a user to a live agent or a telephone call with a live agent, for example, where the system is tracking a trend of estimated confusion or annoyance (e.g., receiving a large number of unsatisfactory responses).

The system interoperates and updates profiles associated with the user as new elements of information are obtained in respect of the questions, and accordingly, earlier answers and stored information on profiles can be utilized, in some embodiments, to skip entire question junctions where the system indicates that such information is already available to the system, or such question is irrelevant (e.g., if there are a line of questions regarding pregnancy to a person who is biologically male, they are simply skipped). As the profiles are updated with information, downstream systems may be configured to modify one or more provisioning decisions in relation to various products and services.

Embodiments of methods, systems, and apparatus are described through reference to the drawings.

This discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Computer-implemented systems and methods are provided for improved generation and control of conversations. A computing device is utilized to control or simulate conversation using estimated contextual cues extracted from profile information or prior responses. The computing device is configured to automatically tailor a flow of a conversation to an effort to improve relevancy and engagement without the need of a human operator to manually tailor the conversation, which, for example, could be impractically expensive.

A structured workflow is maintained in the form of a series of conversation decisions, and a machine learning engine is utilized to maintain a continuously trained data structure that generates predictions that bias conversation decisions (e.g., by weighting tree options) for tailoring the conversation flow. The machine learning engine can be applied to various forms of conversations with humans, such as medical questionnaires, financial product selection, portfolio review, among others. A conversation tool may be provided, that is operable on processors, non-transitory memory, interface devices, among others. In some cases, a specially configured computer server or implementation on sets of distributed computing resources is utilized, and in some embodiments, a special purpose device (e.g., a specialized rack-mounted device/appliance that is configured for a limited set of uses, such as a dedicated, single use device) is provided that is specifically configured and/or optimized for performing the steps of methods of various embodiments described herein.

Referring now to FIG. 1 there is provided a block diagram depicting components of a system as described herein, according to some embodiments. The system 100 is configured to receive instruction sets from client 102 that initiate, for example, a risk assessment application process (other conversation types are possible), via one or more channels (e.g., online via web browser, web chat with an agent, web chat via an automated chatbot, with a live agent). Client/User 102, using a user's device, may be able to initiate the risk assessment in an on demand fashion and the system 100 may be available for use at any time ("client" and "user" may be used herein interchangeably). State variables may be recorded for establishing session continuity.

A neural network system is maintained on the backend machine learning/AI system 120, which maintains a neural network tracking (i) a first set of features representative of one or more observed characteristics of a computing platform or a network connection being used by the user; (ii) a second set of features representative of an estimated current intent, mental state or disposition of the user; and (iii) a third set of features representative of information retrieved from a stored profile of the user. The neural network includes representations maintained through weighting one or more interconnected computing units that represent the features being tracked. Intent can, for example be established by a Watson Conversation Service Component™ (e.g., to establish an intent, entity, slot, and dialog of a conversation), and text to speech/speech to text can be provided, for example, by Watson Speech to Text™ or Watson Text to Speech Service™ components. A natural language understanding service is used to analyze text to extract metadata from content, such as concepts, entities, keywords, categories, and relationships.

The system 100 receives the interview data, which can be text or voice, or other types of inputs. In some embodiments, the type of device or channel being used may influence the tailoring of the conversation through the machine learning engine adapting relationships based at least in part on the type of device or channel being used, and/or transitions between the type of device or channel being used (e.g., phone to web chat may be different from web chat to phone).

In some embodiments, the system 100 is configured to receive instruction sets and response data from the client 102 to initiate and/or complete the risk assessment process via multiple devices 104 (e.g., personal computer (PC), smart phone, telephone, etc.).

Further, the client 102 may be able to suspend and reinitiate the process without loss of a previous session, or information submitted to the system prior to suspension. In some embodiments, client 102 may to begin the process on one device (e.g., computer), and switch to another device 104 (e.g., mobile phone) without loss of information or context.

Where there is a transition, one of the feature sets utilized by the neural network for processing may be replaced with updated information observed in relation to the type of session being used. For example, the sessional information can include identifiers extracted from the system, such as headers indicating a type of application, browser, device, screen resolution, etc., that are being used. This sessional information can, in some embodiments, include networking characteristics, such as a latency level, a bandwidth (e.g., by sending probing packets), among others, which may determine different question variants to be posed.

As a specific, non-limiting example, question variants can include questions which are better rendered on particular types of displays, include (or not include) interactive graphics/descriptions, interactive control elements, or different types of control elements that may be better suited for some sessions than others. For example, sliders and radio buttons are particularly useful on mobile devices, but can be frustrating on desktop screens. Conversely, free text input boxes are useful in obtaining large amounts of information but can be frustrating on mobile.

In some embodiments, the number of questions forming the risk assessment procedure may be automatically reduced as the system 100 automatically computationally determines the next best question based on analysis of the answer data sets the client 102 communicates to the system responsive to the previous questions.

The next best question determination is a dynamic process that is modified based on the features being tracked by the neural network. For example, the neural network stored on 120 is utilized to rank a series of potential next questions in the sequence flow to establish a next best question to be posed to the user through the interface. In some embodiments, the sequence flow of questions is a represented as a decision tree having multiple junctions which are traversed as questions are answered by the user.

The neural network is utilized to contextually derive the next best question based on tracked elements of information and may change, for example, based on an environmental context of the user (e.g., type of device being used, bandwidth of network connection), an intent/disposition based score associated with the user (e.g., a detection of annoyance, frustration, or confusion), and known profile information stored in relation to the user (e.g., gender, educational level, language fluency, disabilities).

The automatic determination is conducted free of human intervention. Questions posed by system 100 to client 102 may be tailored based on other information, for a non-limiting example, demographic data and data available from a previously created client profile retrieved from a computer memory. The tailoring of questions may use a combination of the previously created client profile, and the user's previous answers, for example.

As noted in some embodiments, tracking separate sets of features for neural networking can be useful in providing pause/resume functionality as certain contexts (e.g., computing environment) may change, but certain contexts may remain the same or similar (e.g., profile information, a determined level of intent or disposition). Intent or disposition may be ascertained through tracking how much time a user "dwells" on a particular question, how often a user requests clarifications (e.g., interacts with interactive elements tracking requests for clarification), how quickly questions are being answered, how many questions are simply skipped, or, in some embodiments, an explicit question or interactive control for the user to be able to express a level of frustration. Requests for clarifications can include, for example, explanations of medical terms, among others, or where users submit questions in response to questions (e.g., a response to "have you ever had an abnormal ECG" is responded with "can you explain what an abnormal ECG is".

As noted in some aspects, a recorded snapshot of the feature sets can be recorded for use for providing the pause feature, whereby the snapshot of the feature sets can include only a subset of the available feature sets when the snapshot is taken.

When the series of questions are resumed, the neural network can be provided the subset of recorded features in combination with an updated set of features (e.g., representing that the user has now moved to a desktop in a quiet office), and the next best question can be regenerated using the combined set of recorded features and new features.

In some embodiments, system 100 may produce copies of the questions and answers posed to, and received from, client 102 in order to fulfil legal, regulatory, compliance, and/or other requirements. The set of question data objects are a set of question junctions to be traversed, each having child question data objects which can be selected from by the neural network. The child question data objects, for example, can represent different types of rendering (e.g., for mobile, for desktop), differing levels of complexity, differing speeds of playback (if audio), and the feature sets are utilized to differentiate between different child question data objects for selection. Question variants may have different sub-question branches, and may include additional branch logic.

The set of question data objects can be represented in a decision tree data structure representing a sequential flow of questions and including variant question data objects available at various junctions of the decision tree data structure. Variant questions can include open ended questions, such as "what medications are you taking?", and the answer could be, for example, a response required in a free form text (e.g., 4 years ago I took Tylenol and now I take it daily), radio button inputs, checkboxes, etc. Other variant questions can have different wording or different types of input, different types of interface controls, different formatting, etc.

In the context of answering questions, for example, in relation to a health insurance questionnaire, junctions of the decision tree data structure are sequentially traversed and at each junction, the processor determine the next best question data object for presentment to the user. In this example embodiment, this process continues until the decision tree data structure is traversed to a terminal node of the decision tree data structure. The variant question data objects can include, for example, branch logic or additional sub questions (e.g., breaking up a question into smaller questions), which in some case can cause a rendering of one or more dynamic interface objects for presentment to the user through a user interface, such as a frequency asked question screen, a live agent chat widget, additional explanation pages or word definitions, among others. Branch logic can be utilized to bypass or flag questions for revisiting.

In some embodiments, system 100 provides an interface to an underwriting engine 112. In some embodiments, system 100 is configured to automatically determine that simplified explanations of medical terms and/or industry specific terms are required (e.g., instead of "contusion" or "hematoma", "bruise" is utilized as a simpler term). In some embodiments, simplified explanations may be requested by client 102. For example, responsive to the earlier requests for simplified explanations, the system 100 may be configured to become biased towards providing simplified explanations of downstream terms. Where profile information is utilized, further biasing (or less biasing) may occur. For example, the system 100 may maintain relationships and correlations showing a strong relationship between various age ranges and the need for simplified explanations.

Non-verbal aspects of the discussion may also be tracked, and used for conversation flow tailoring. For example, various monitored aspects that can be estimated from a voice recording can be utilized to determine whether the user is annoyed or frustrated. There may be marked changes in intonation, pitch, speed of responses, etc. Where the system 100 detects a potential level of annoyance, a machine learning engine can modify the workflow in an attempt to ease frustrations (e.g., reduce a number of questions being asked, asking more simple questions, removing optional questions), etc.

The system 100 may automatically indicate, for example, after a ten year old patient asks for a simplified explanation, downstream questions are heavily biased towards simplified explanations. Conversely, for a thirty year old patient who profile indicates employment as a pharmacist technician, the request for simplified explanations may not be weighted as heavily in future decision making. Other considerations include location, address, education level, device type, channel, etc.

In some embodiments, where a client 102 has opted to conduct the process via voice, the spoken words of the client 102 may be converted to text using a speech-to-text service. The text may then be submitted to an interview processing unit 111. As a non-limiting example, a client 102 may interact with the system 100 via a web based application (WebApp) installed on a laptop computer and transmit recordings of the client's voice to system 100 via the laptop's microphone. The WebApp may be provided by system 100 (e.g., see 106). System 100 may transform the audio recording into an text transcript via a speech-to-text process, and transmit the text file to an interview processing unit 111 directly.

Accordingly, contextual cues are entered into the neural network, which determines the flow of questions, including, in some embodiments, how questions are presented, how/what information is rendered, and whether additional question junctions are inserted (e.g., due to unsatisfactory answers) or question junctions are bypassed as questions are deemed irrelevant or already answered based on earlier answers.

A processor operates in conjunction with computer memory to train the neural network using a set of training data to establish weighted interconnections between the one or more interconnected computing units, and to monitor observed characteristics of the computing platform or the network connection being used by the user in provisioning of an incoming answer string and update a first set of features based on the one or more observed characteristics.

An incoming answer string from the user is parsed into string tokens, and using a natural language processing engine, the string tokens are parsed to estimate the current intent, mental state or disposition of the user which are used to update the second set of features. Elements of information are extracted from the incoming answer string, and used to update the profile, including the third set of features.

To determine a next best question from a set of candidate next best questions (e.g., questions available at a particular junction of the decision tree being traversed), each question data object from the set of available question data objects is processed through the neural network to establish a match score for each question data object and the next best question data object is based at least on the match score corresponding to each question data object.

In some embodiments, as questions are answered, the profile associated with the user to incorporate the new elements of information. The processor, in some embodiments, in processing questions posed at a junction to assess the next best question, may determine that all question candidates have low scores. In such an example, the processor may then skip the junction entirely as the question may be irrelevant in view of profile information (e.g., avoiding asking questions about pregnancy to a user who has previously entered male as biological gender).

In some embodiments, if the interview session is paused and restarted, the interview processing unit 111 may resume the interview in context by identifying the client 102 (e.g., via a unique user account), retrieving the interview process state data from the previous session from a memory by initiating a suspend-resume service and querying records associated with the client 102. This suspend-resume service may include checking one or more values associated with the client's 102 risk profile via an underwriting predictive analytics engine 114.

In some embodiments, for the transcripts of saved recordings of client's 120 voice in text format or input from client 120 originally transmitted in text format (or any data from client), a natural language processing service may be applied to analyse and retrieve context and content from the text. Transmission of data occurs between one or more client devices 104 and the interview processing unit 111 and there may be additional intermediary processing activities. For example, a client may respond to a question naturally in plain language, the natural language processing service may parse and identify data entities and parameters in the client's response and cause them to be stored in a memory.

In some embodiments, the processor is configured to process the incoming answer string to determine a score of the incoming answer string indicative of a level of completeness between the incoming answer string and an underlying question the incoming answer string is being provided as a response.

In an alternate embodiment, the processor is configured to transition to a next junction of the decision tree data structure only if the score indicative of the level of completeness is greater than a predefined threshold. In an alternate embodiment, the processor is configured to modify the decision tree data structure to reinsert a junction associated with the underlying question if the level of completeness is less than a predefined threshold, the reinserted junction re-inserted prior to the terminal node of the decision tree data structure.

Figure 2A:
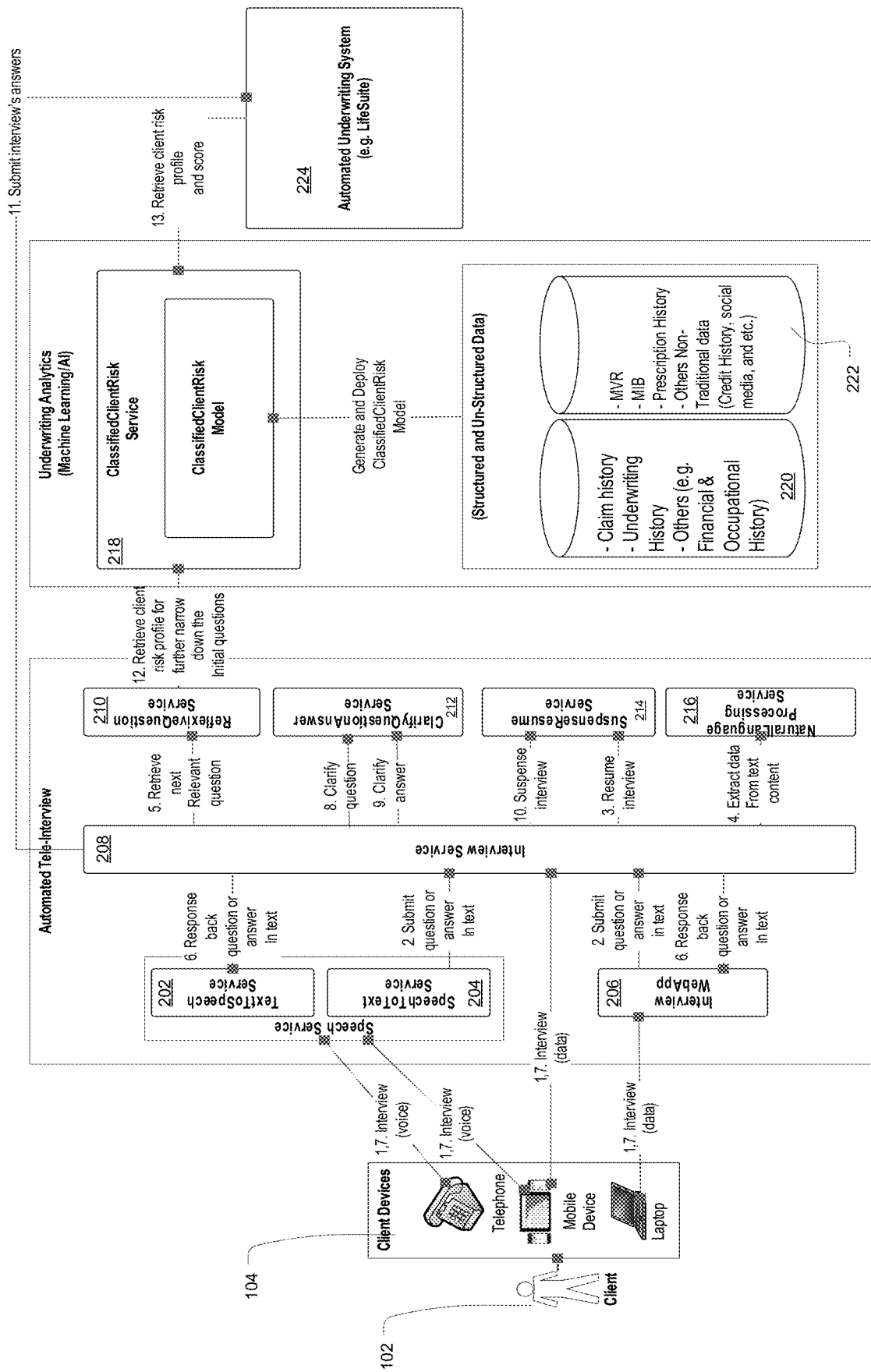
FIG. 2A is a block diagram depicting components of an automated risk assessment system, according to some embodiments.
Figure 2B:
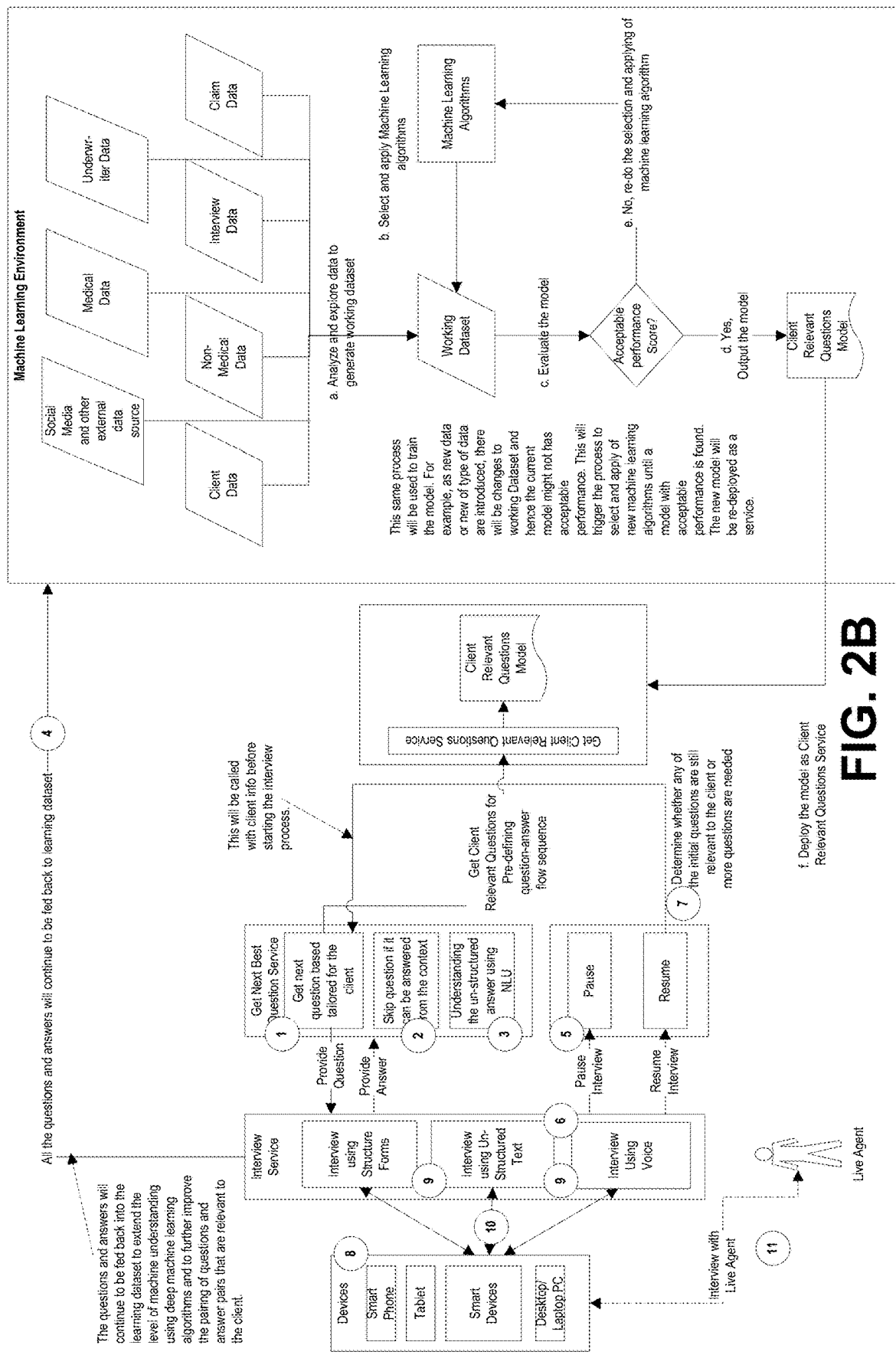
FIG. 2B is a process flow diagram depicting the components of an automated risk assessment system of FIG. 2A in operation, according to some embodiments.

Referring now to FIG. 2A there is provided a block diagram depicting components of an automated risk assessment system, according to some embodiments. FIG. 2B is a process flow diagram depicting the components of an automated risk assessment system of FIG. 2A in operation, according to some embodiments. FIG. 2B has a series of enumerated circles that are also used for reference.

In relation to circles 1-7, a tailored conversation flow is provided in relation to determining the flow of the next best question, based on the following example. The output from the natural language processing service 216 is forwarded to a reflexive question engine 210 to retrieve the next relevant question. Reflexive question engine 210 is configured to process the client's 102 response to determine a next relevant question. When a client starts an interview, the reflexive question engine 210 is configured to load the questions tailored specifically and relevant to the client. The questions relevant to client are determined by applying a machine learning algorithm for classification to the dataset which composed of Internal data (e.g., client profile data, historical data, underwriting and claims historical data from a database) and external data sources such as social media and other sources. The loaded set of questions is used to create the pre-defined questions and answers sequence flow. For example, if client is male, then questions and answers sequence flow will not contain any question related to pregnancy.

When the client answers the question, the reflexive question engine 210 can issue control commands to skip the subsequent questions based on the answer and context. For example, if client answers that he/she has no heart related problem, the reflexive question engine 210 will cause the conversation workflow to skip all the heart related questions.

When the client answers the free form text question, the reflexive question engine 210 is configured to use NLU (Natural Language Understanding), in some embodiments with custom modeling, to understand the content. Based on the level of understanding, the following scenarios can occur:

The reflexive question engine 210 will parse the content, and based on pairing of words and phrases, select another question to further refines the understanding and gather the details in data structure.

If the reflexive question engine 210 has reached a sufficient level of understanding of the content based on the words and phrases that are mapped, it will store the answer in text as is. If the reflexive question engine 210 is not able to understand the content, then it stop the interview and transfer the interview to live agent.

The questions and answers will continue to be fed back into the learning dataset to extend the level of machine understanding using deep machine learning algorithms and to further improve the pairing of questions and answer pairs that are relevant to the client.

In some embodiments, where client is submitting responses verbally, an interview processing unit 208 invokes a text-to-speech engine 202 to convert a text response generated by system 200 to a simulated verbal response which may be played back to client 102 via client device 104.

In some embodiments, the client 102 may ask to clarify a question or the interview processing unit 208 may be called to retrieve a clarified response from client 102 after the system 200 has processed client's 102 response (e.g., if the answer is not clear and/or not relevant to the question posed by system 200). This may be accomplished by invoking clarification engine 212.

Circles 5-7 of FIG. 2B are provided in relation to indication the operation of the resume/suspend feature.

In some embodiments, client 102 may suspend the interview session at any point. The interview processing unit 208 may, in response to such suspension, invoke the suspend-resume service 214 to suspend the interview by saving interview state data and other data in a memory and associating same with the client 102.

In operation, during the interview, the client can suspend the interview at any point in time by providing the keywords either in text or voice (e.g., control commands indicative of a desire to stop for a period of time). The questions and answers and context of the interview up to that point will be saved in the database with unique identifier. This unique identifier code will be provided to the client so the client can use it as a reference to resume the interview at another time.

The interview can be resumed using voice or text which can be different than the original medium used when the client suspended the interview. The interview processing unit 208 is configured to invoke the suspend-resume service 214 to retrieve breadcrumb (e.g., snapshots) information and anchors stored in memory to re-initiate the conversation flow. A stored, weighted data structure is accessed to enable the natural language understanding aspects of the reflexive question engine 210 to continue based on the modified conversation structure based on prior answers, stored profile information, and/or demographic information.

When the client resumes the interview, the system will use reflexive question engine 210 to determine whether any of the initial questions are still relevant to the client or more questions are needed to be asked based on the client's latest up to date information. If there are changes to the client's data, the system 100 is configured to control an interface to display a request to confirm the changes and then ask additional questions as required depending on the changes. For example, initially when the client started the interview, based on client profile and external data, all the hazardous/extreme sports questions are not relevant to the client. Before resuming the interview, the client has gone for sky diving and post the information in social media. This information will be available in the dataset and the reflexive question engine 210 will have the information and determine that the hazardous/extreme sports questions are now relevant to the client, assuming that client has provided consent for the system 100 to use the information for this purpose.

In some embodiments, when the interview is completed, the interview information (e.g., text answers to the questions) may be submitted to an automated underwriting system 224 for invoking backend processes that undertake the underwriting process.

Circles 8-11 of FIG. 2B are provided in relation to indication the operation of the multiple device usage features, according to some embodiments.

Where multiple devices are utilized, the system is configured to start/stop/suspend and resume across multiple devices. For example, there may be different points of contact for initiating contact with the conversational workflow. A client may, for example, start the interview using different devices such as a smart phone, tablet, desktop/laptop PC and smart device (e.g., Amazon Echo™, Google Home™, Apple HomeKit™). Depend on the device, the client can start the interview on any channels: On-line un-structured text via chatbot, voice via chatbot, on-line structured form, un-structured text or voice via live agent.

The client can start the interview on one channel (e.g. un-structure text) and switch to another channel (e.g., voice) while maintaining context so that the client can transfer the interview from one channel to another channel without any disruption. The client can switch from any channel to a live agent while maintaining the context so that the client can continue the interview where it last stopped a live agent.

Transition information may be utilized by the suspend-resume service 214 to modify conversation pathways and to pose different questions or differently worded questions. For example, the system 100, through prior interactions, may be biased towards providing simplified questions on mobile devices and more complicated questions on desktop environments where there is presumably a higher resolution and more screen space available. This trend may be indicated, for example, by an increase in clarification requests when complicated questions are posed on mobile, etc. In response to this trend, the system 100 may then pose simpler questions on mobile, and note a corresponding decrease in clarification requests.

In some embodiments, by applying data analytics capability via a data analytics engine (e.g., 218, 220, 222) to various data associated with a client 102, the client risk profile may be classified and categorized before the interview session begins. Based on the classification and categorization conducted by the data analytics engine, the reflexive question engine 210 may personalize the set of questions to be posed to the client 102. Upon receiving satisfactory responses to the personalized set of questions derived from the classification and categorization performed by the data analytics engine, the client risk profile can be classified and scored by system 200. A score and classification may be used as additional input in one or more processes requiring risk information and risk mitigation measures (e.g., the underwriting process).

Figure 3:
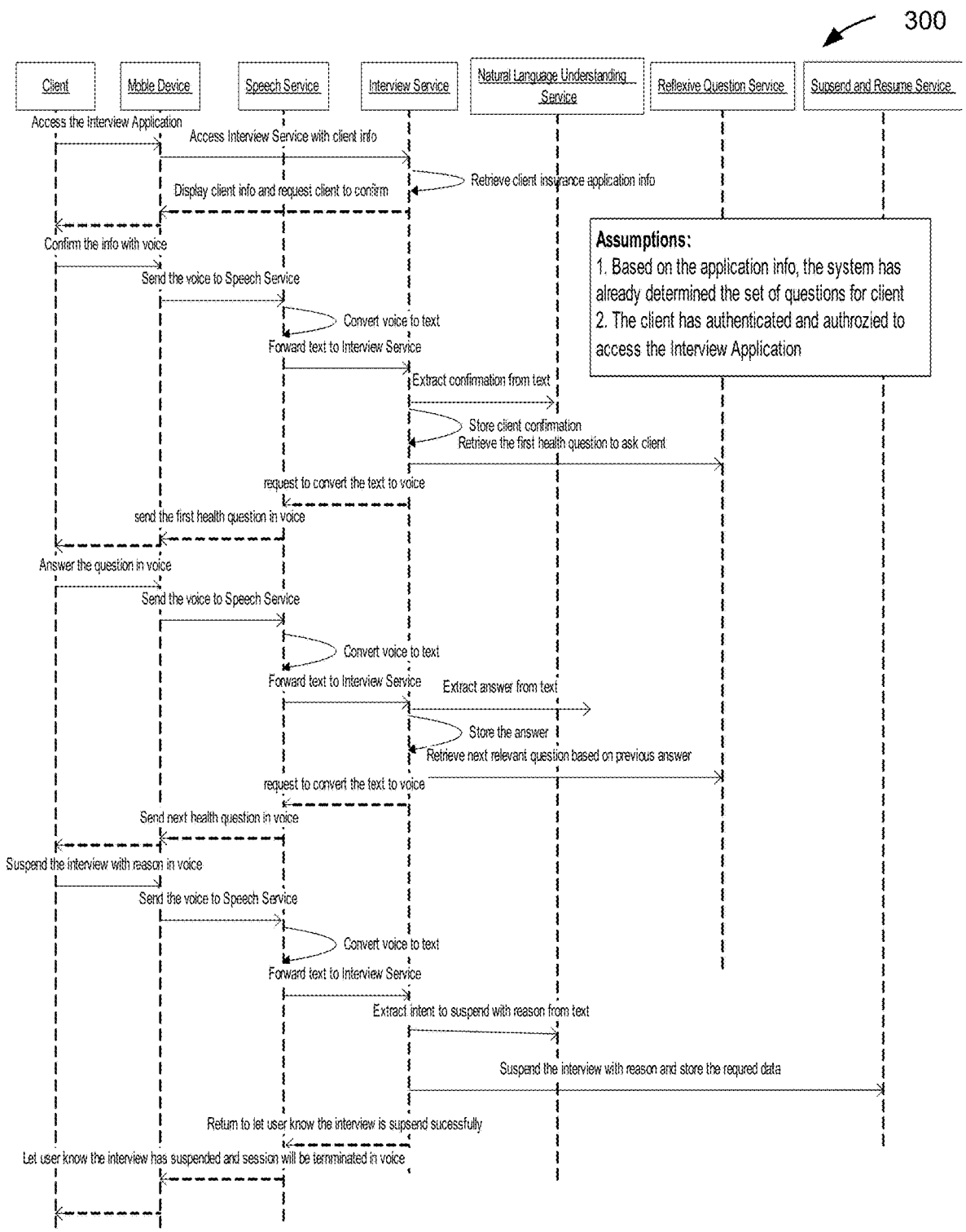
FIG. 3 is a process flow diagram depicting a logic flow governing the automatic suspension and resumption of an automated risk assessment process, according to some embodiments.

Referring now to FIG. 3 there is provided a process flow diagram depicting a logic flow governing the automatic suspension and resumption of an automated risk assessment process, according to some embodiments. The user may request to suspend the interview process, and in response the system 300 may ask for a reason. Once the user provides the reason, system 300 may save the reason to a computer memory. The system 300 may then save to a memory all the changes to the information in the client profile as well as any questions and answers provided.

In some embodiments, The system 300 may designate the interview as incomplete if the user suspends the interview. System 300 may then save to a memory all the changes to the information in the client profile as well as any questions and answers provided. The system 300 may send notification to a human agent to follow-up as required.

In some embodiments, the system 300 may provide means for resuming an interview at the question last posed to the client. The system 300 may request client to review the submitted info, and the questions previously answered during the previous interview session, and confirm that stored data are accurate and up to date. If the client confirms, the system 300 may ask the next question (e.g., resume where the previous session was suspended).

In some embodiments, once the client answers the remaining questions after resuming the session, the system 300 may compare the user's responses with one or more customer data values stored in external databases (e.g., credit history, medical history, granular spending and payment behaviour data values from banking databases, social media history, driving telemetry, etc.). Next, the reflexive question engine 210 may determine the appropriate next question to pose to user and system 300 may present user with said question. Upon completion of all required questions, the system 300 may transmit all the questions and answers to a memory (e.g., an internal hard drive or network attached database).

Figure 4:
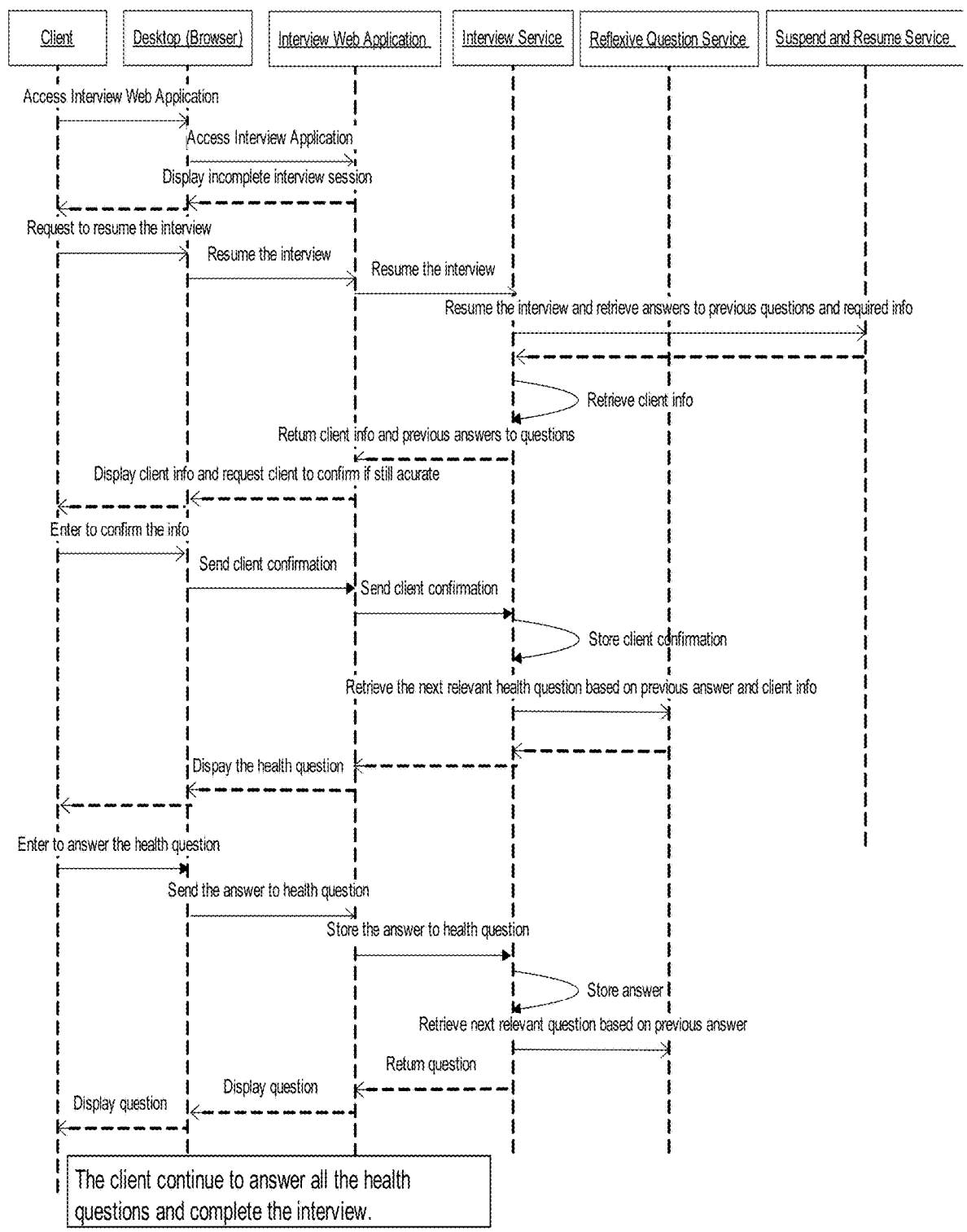
FIG. 4 is a process flow diagram depicting a logic flow governing the automatic resumption and completion of an automated risk assessment process, according to some embodiments.

Referring now to FIG. 4 there is provided a process flow diagram depicting a logic flow governing the automatic resumption and completion of an automated risk assessment process, according to some embodiments. The system 400 may request client to review the required information, the questions, and answers provided during previous interview sessions, and may require the client to confirm that all information is accurate and up to date. If the client confirms, the system 400 may pose the next question in sequence to the client (e.g., continue where it left off).

In some embodiments, if the client answers the question, the system 400 may compare the answer with information retrieved from one or more external databases (e.g., a medical insurance bureau (MIB) database). The system 400 may then transmit information to the reflexive question service (e.g., 210 in FIG. 2) and may repeat this process until all the required information has been received from the client. The system 400 may transmit all the questions and answers to be stored in a memory.

In some embodiments, the system 400 is configured to generate a visual representation of the client's responses to be displayed on the client device to ensure they were accurately recorded. If the information has not been accurately recorded, the client may make required changes to the information (e.g., by re-stating the correct information), and this reinstatement information may be utilized to retrain the system. Once the client is satisfied that accurate information has been recorded, the system 400 is configured to record the changes in memory.

Figure 5:
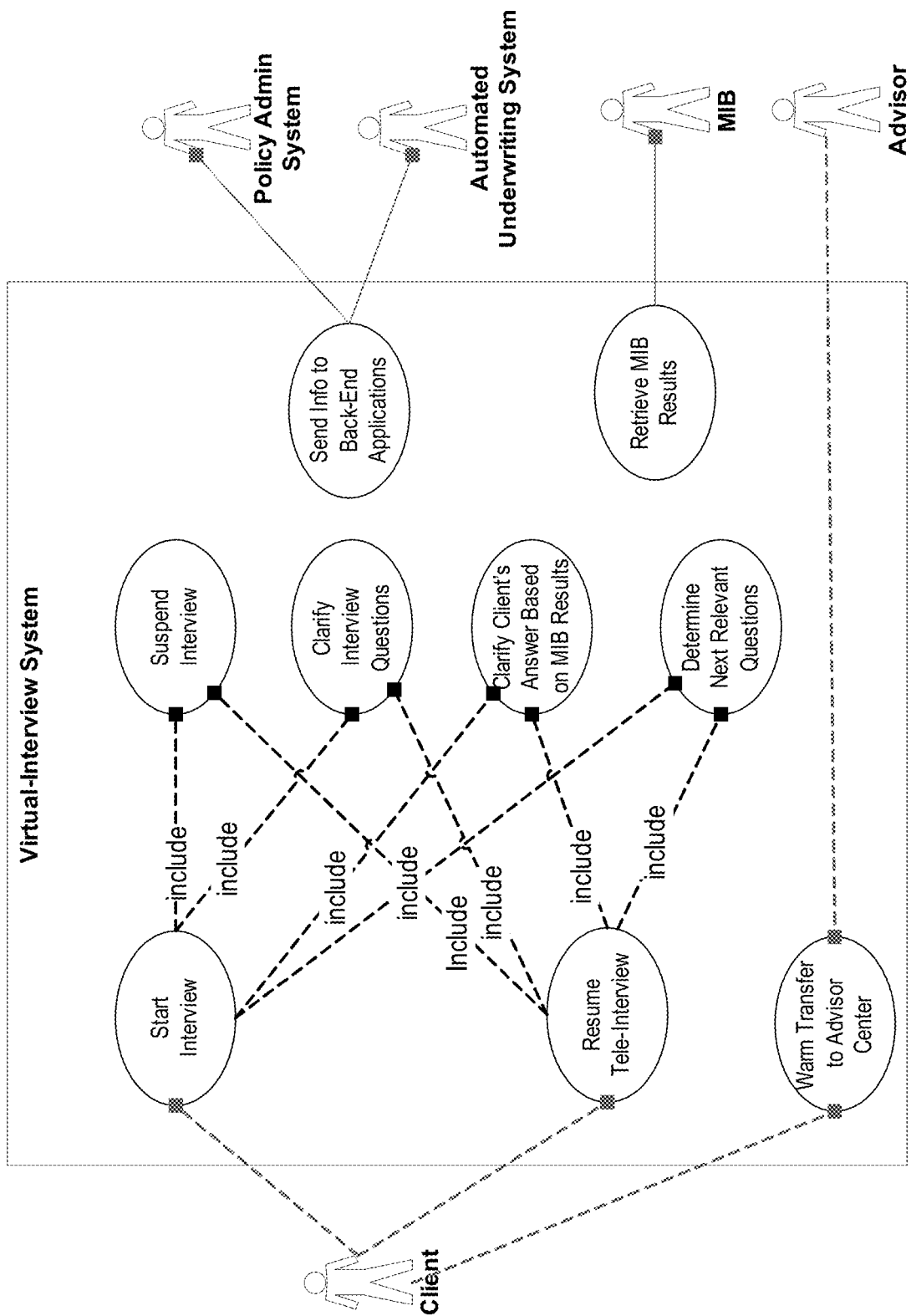
FIG. 5 is a process diagram depicting an example use case of the systems and methods described herein, according to some embodiments.

Referring now to FIG. 5 there is provided a process diagram depicting example use cases, according to some embodiments.

Figure 6:
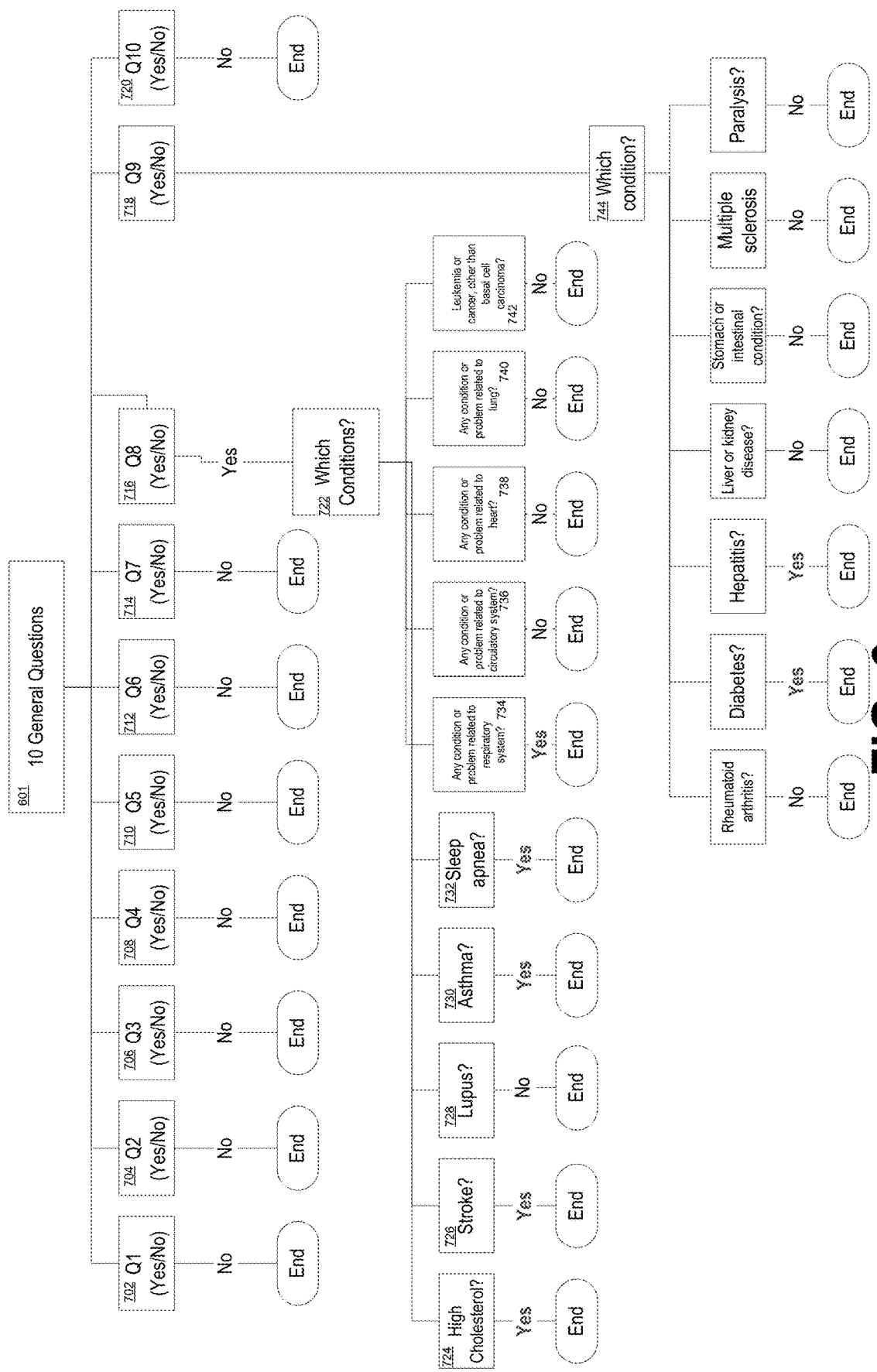
FIG. 6 is a process diagram depicting a logic flow governing the automatic determination of next queries to be posed to a user based on the user's responses to previous queries, according to some embodiments.

Referring now to FIG. 6 there is provided a process diagram depicting a logic flow governing the automatic determination of next queries to be posed to a user based on the user's responses to previous queries as part of a, according to some embodiments. At 601, the system presents the client with one or more general questions (602-620). Upon receiving responses each general question, the system determines (e.g., via the reflexive question service) which question should follow.

For example, at 602-614, the response provided by the client indicates to the system that no follow-up questions are required and system issues control commands to allow the conversation to proceed to the next question. However, at 616, processing the response, the system determines that additional information is required. As a result, system produces follow-up questions 624-642 and poses them to the client in order to obtain necessary data to complete the client profile and produce an effective risk assessment.

Figure 7:
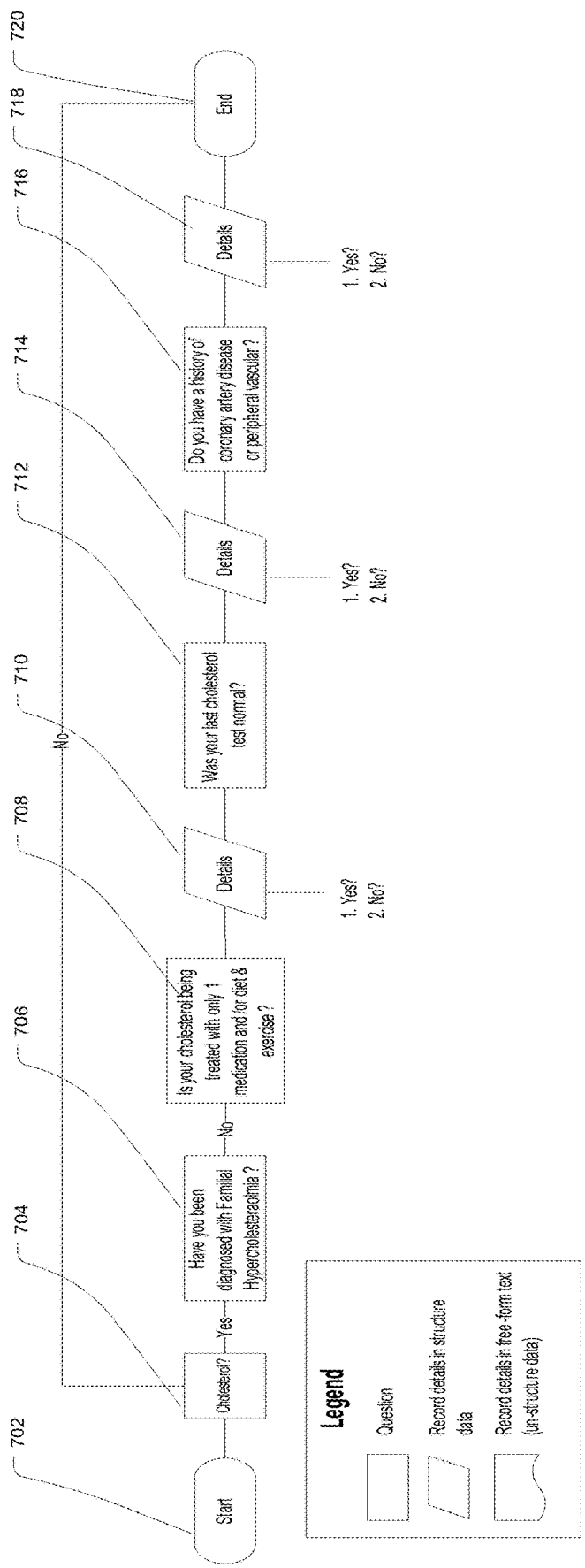
FIG. 7 is a process diagram depicting a logic flow governing the automatic determination of next queries to be posed to a user undergoing a cholesterol focused medical history questionnaire based on the user's responses to previous queries, according to some embodiments.

Referring now to FIG. 7 there is provided a process diagram depicting a logic flow governing the automatic determination of next queries to be posed to a user undergoing a cholesterol focused medical history questionnaire based on the user's responses to previous queries, according to some embodiments. At 702, the system is configured to initiate an automated interview process. At 704, the user is presented with questions adapted to ask whether he has ever been diagnosed with high cholesterol, and a negative answer may cause the process to end.

Upon a positive response at 704, at 706, the system is configured to identify the next best question, and for example, user may be asked if he has ever been diagnosed with Familial hypercholesterolemia. At 708 the interface may present the user with a question of whether his cholesterol is being treated with only one medication and/or with diet and exercise.

The user's responses to the previous questions may be recorded in structured data at 710. At 712, the system is configured to generate a question asking if his last cholesterol test resulted in normal readings. The user's response to the previous question may be recorded in structure data at 714. At 716, the system is configured to generate a question asking whether the user has a history of coronary artery disease or peripheral vascular disease. At 718, the user's response to the previous question may be recorded in structured data to a memory and the process may end at 720.

Figure 8:
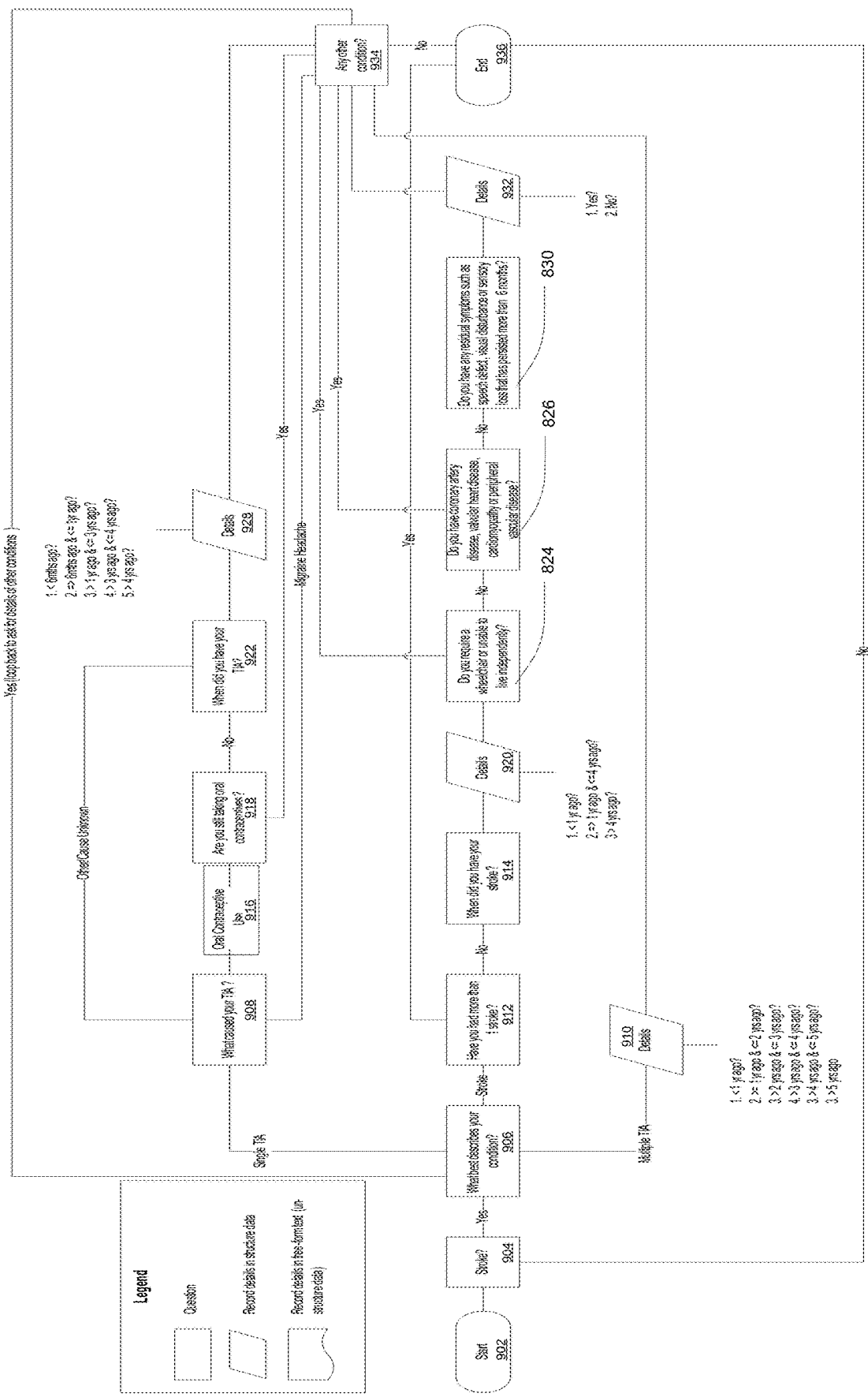
FIG. 8 is a process diagram depicting a logic flow governing the automatic determination of next queries to be posed to a user undergoing a stroke focused medical history questionnaire based on the user's responses to previous queries, according to some embodiments.

Referring now to FIG. 8 there is provided a process diagram depicting a logic flow governing the automatic determination of next queries to be posed to a user undergoing a stroke focused medical history questionnaire based on the user's responses to previous queries, according to some embodiments.

At 802 the process begins and the device is initialized, ready to receive input data sets. At 804, the user is presented a question of whether she has ever suffered a stroke. The process may end at 836 if the user responds in the negative. If the user responds in the positive, at 806, the user is presented with a question asking which among a set of options best describes her current condition. If the user response multiple Transient Ischaemic Attacks (TIAs), at 810, the system is configured to respond by presenting the user with questions designed to produce details about the TIAs at 810 and the user is presented with a question asking if she has any other conditions at 834.

If at 806, the user responds that a single TIA best describes his condition, at 808, responsive to the response data set, the system may question the user as to the details of what cause the TIA, if the response is migraine headaches, the user may be asked if she has any other conditions at 836. At 816, the user is presented with a question asking if use of oral contraceptives caused her TIA, at 818 the user is presented with a question asking if she is still taking oral contraceptives, if the response is positive, the user may be asked if she has any other condition at 836. If the user responds that she is no longer taking oral contraceptives, response to that data set, at 822, the user is asked when she had her TIA, and her response may be stored in a memory and categorized based on the time elapsed.

If at 806, the user responds that stroke is the best description of her condition, at 812 the user is presented with a question if she has suffered more than one stroke. If the answer is affirmative, the process may end at 836. If the answer is negative, at 814, the user is presented with a question asking when she suffered her stroke, and her response may be stored in a memory and categorized based on the time elapsed since the stroke at 820. At 824, the user is presented with a question asking whether she requires a wheelchair or assisted mobility device and/or if she is unable to live independently. If the response is positive, the user may be asked if she has any other conditions at 834.

At 826, the user is presented with a question asking if she has coronary artery disease, heart disease, cardio myopathy, or peripheral vascular disease. If the response is positive, the user is presented with a question asking if she has any other conditions at 834. At 830, the user is presented with a question asking if she has any residual symptoms such as speech defects, visual disturbance, or sensory loss, and if that residual symptom has lasted more than six months. At 832, details of the user's responses may be stored in a memory. At 834, the user is presented with a question asking if she has any other conditions—if the response is affirmative, the process may return to 806, if the response is negative, the process may end at 836.

Figure 9:
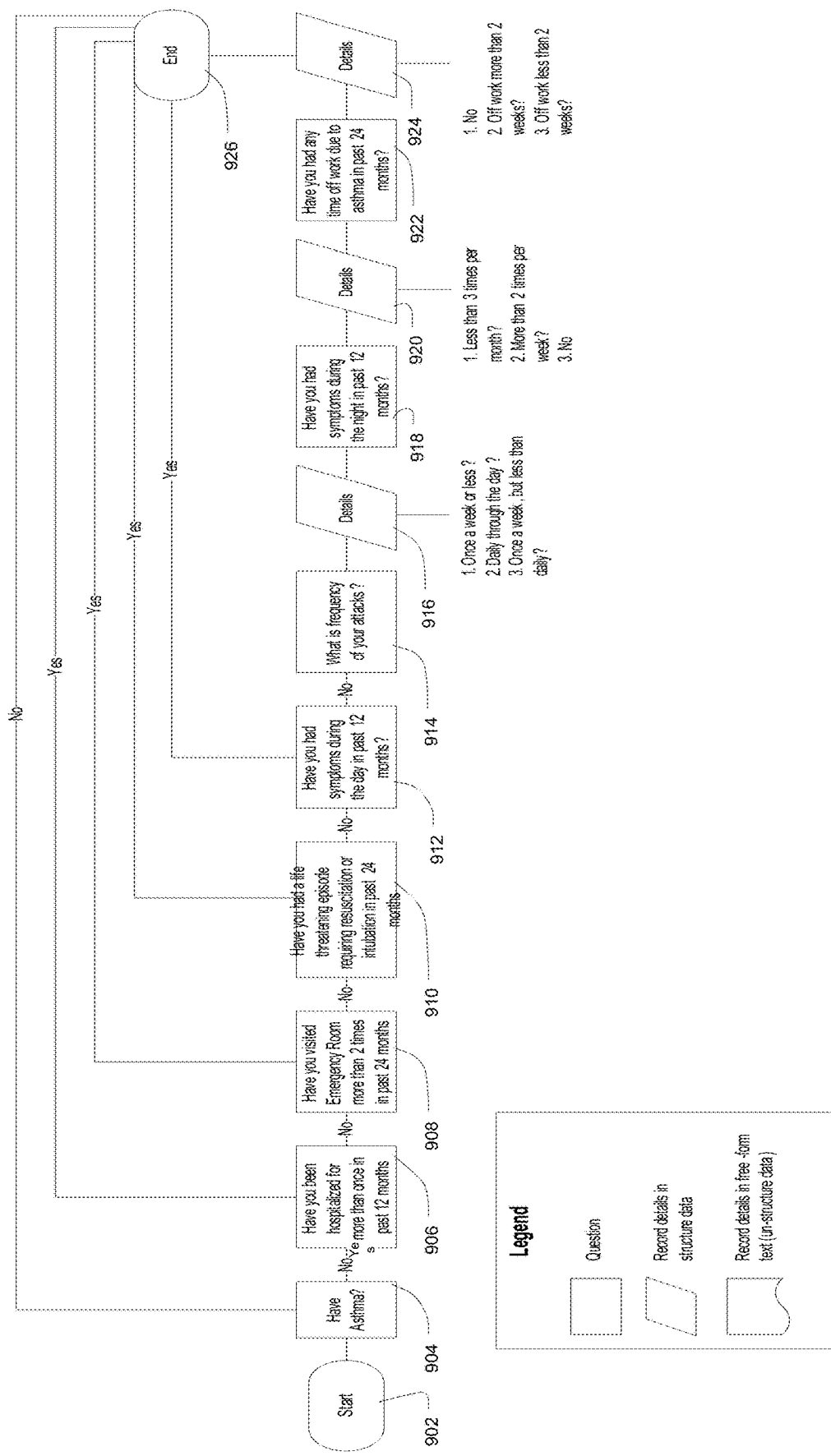
FIG. 9 is a process diagram depicting a logic flow governing the automatic determination of next queries to be posed to a user undergoing an asthma focused medical history questionnaire based on the user's responses to previous queries, according to some embodiments.

Referring now to FIG. 9 there is provided a process diagram depicting a logic flow governing the automatic determination of next queries to be posed to a user undergoing an asthma focused medical history questionnaire based on the user's responses to previous queries, according to some embodiments. At 904, the user, through user's device, is presented with a question asking if he has asthma. If the response is negative, the process may end at 926.

At 906, the user is presented with a question asking if he has been hospitalized more than once during the previous 12 months. At 908, the user's device presents to the user a question asking if he has visited the emergency room more than twice in the past 24 months. At 910, the device presents to the user with a question asking if he has ever had a life threatening episode requiring resuscitation or intubation in the past 24 months. At 912, the device presents to the user a question asking if he had symptoms during the day during the past 12 months. If the answer to any of 906-912 is affirmative, the process may end at 926.

At 914, the user is presented visual interface elements that are adapted to categorize the frequency of his attacks according to presented options (e.g., weekly, monthly, annually, bi-weekly, semi-weekly, etc.). At 916, the previous responses are stored in a memory and categorized. At 918, the user is presented with a question asking if he has suffered any symptoms at night during the past 12 months. At 920, the previous responses may be stored in a memory and categorized. At 922, the user, through user's device, is presented with a question asking if he has required time off of work due to asthma during the past 24 months. At 924, the previous responses is stored in a memory and categorized. At 926, the process ends.

Figure 10:
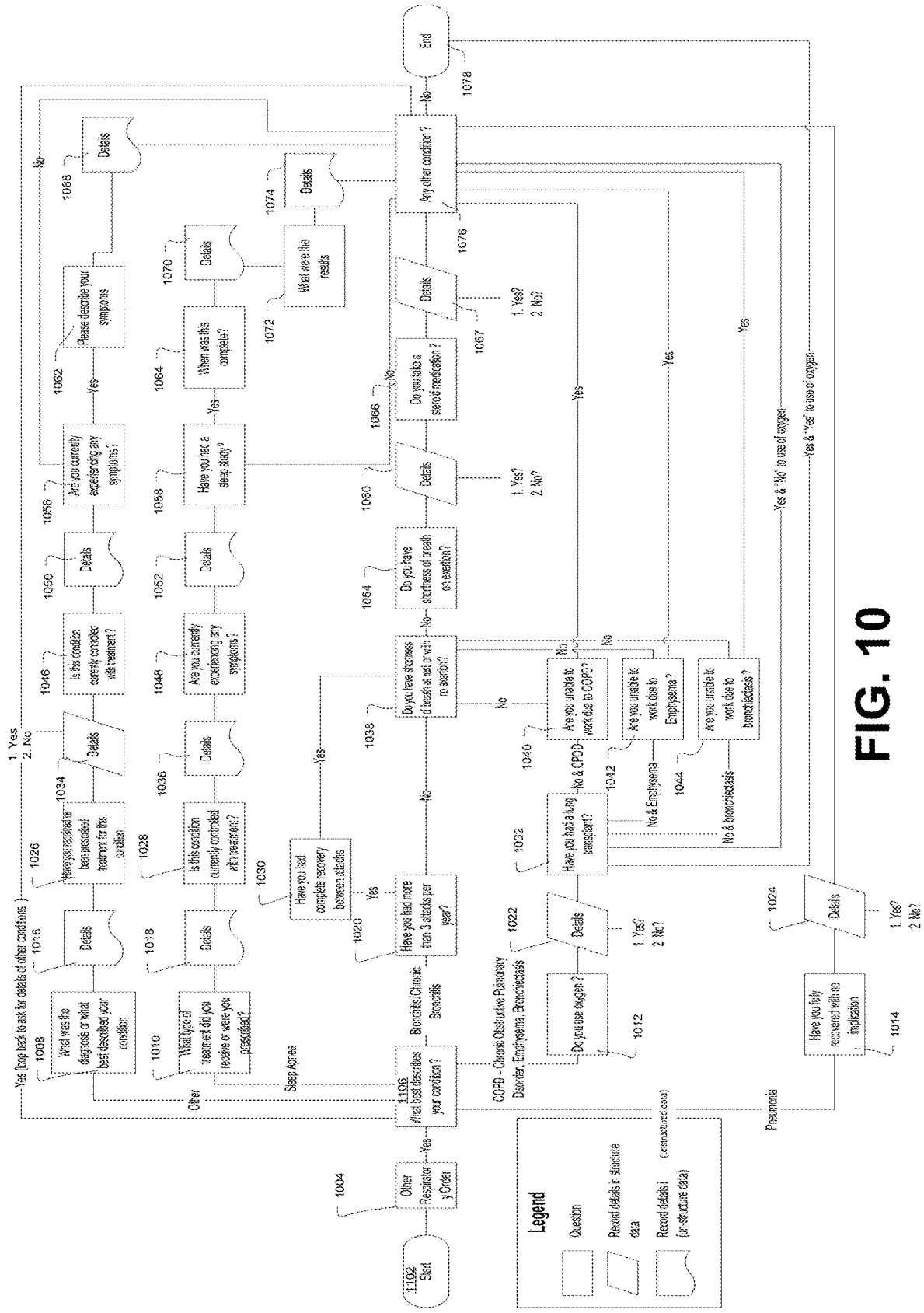
FIG. 10 is a process diagram depicting a logic flow governing the automatic determination of next queries to be posed to a user undergoing a respiratory health focused medical history questionnaire based on the user's responses to previous queries, according to some embodiments.

Referring now to FIG. 10 there is provided a process diagram depicting a logic flow governing the automatic determination of next queries to be posed to a user undergoing a respiratory health focused medical history questionnaire based on the user's responses to previous queries, according to some embodiments. The process of FIG. 10 resembles that of FIG. 9, except that additional pulmonary diseases (e.g., sleep apnea, chronic obstructive pulmonary disorder (COPD), Bronchitis, etc.) may be included in the process as an illustrative example.

Figure 11:
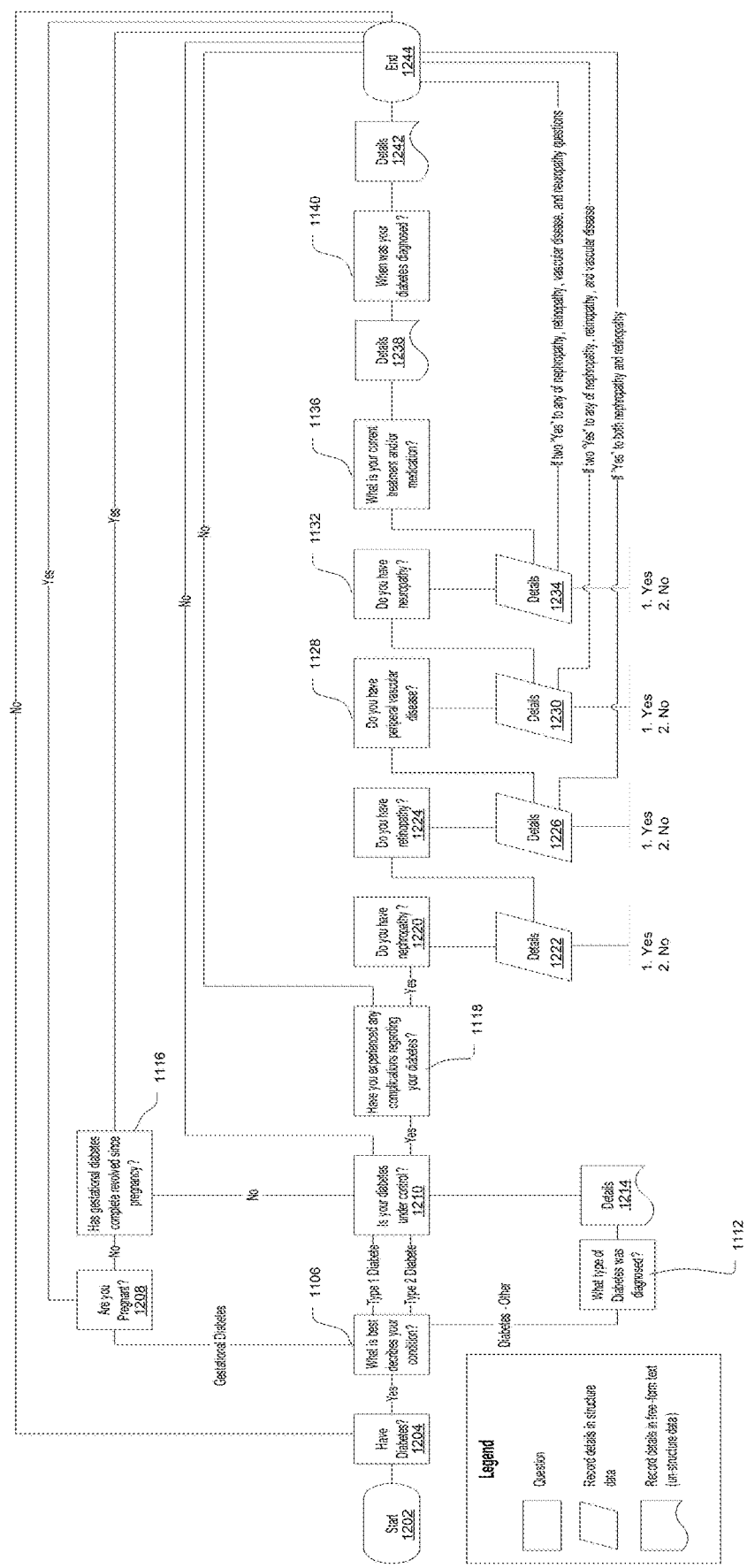
FIG. 11 is a process diagram depicting a logic flow governing the automatic determination of next queries to be posed to a user undergoing a diabetes focused medical history questionnaire based on the user's responses to previous queries, according to some embodiments.

Referring now to FIG. 11 there is provided a process diagram depicting a logic flow governing the automatic determination of next queries to be posed to a user undergoing a diabetes focused medical history questionnaire based on the user's responses to previous queries, according to some embodiments. At 1104, the user is presented with a question asking if she has diabetes. If the response is negative, the process may end at 1144. If the user's answer is affirmative, the user interface is configured to pose further options and the user is required to select from one or more interface elements, symptoms or indications which best describes his condition at 1106 (for example, scales relating to pain, loss of feeling from diabetes).

At 1108, if the user's response to the question at 1106 is "general diabetes", the device presents to the user a question asking if she is pregnant. At 1116, if the user responds that she is not pregnant, the device presents to the user a question asking whether gestational diabetes has completely revolved since any previous pregnancy. If the user's response is affirmative, the process may end at 1144. If the user's response is negative, the process may proceed to 1110.

At 1106, if the user's response to the question at 1106 is "type 1 diabetes" or "type 2 diabetes", the user device presents to the user a question asking whether her diabetes is under control at 1110. Upon receiving the user's response, the process 1100 may cause details of the user's response to be written to a memory in free-form text at 1114.

At 1106, if the user's response to the question at 1106 is "diabetes—other", the user may be asked what type of diabetes was diagnosed at 1112. Upon receiving the user's response, the process includes causing details of the user's responses to be written to a memory in free-form text at 1114.

At 1110, the user is presented with a question asking if her diabetes is under control. If the user's response to the question at 1110 is negative, the process may end at 1144. If the user's response to the question at 1110 is affirmative, the process may proceed to 1118.

At 1118, the user is presented with a question asking if she has ever experienced any complications regarding her diabetes. If the response is negative, the process may end at 1144. If the response is affirmative, the process may proceed to 1120.

At 1120, the user is presented with a question asking the user indicate whether or not she has any type of nephropathy. Upon receiving the user's response, the process 1100 may cause details of the user's responses to be written to a memory in free-form text at 1122. At 1124, the user may be asked to indicate whether or not she has any type of retinopathy. Upon receiving the user's response, the process 1100 may cause details of the user's responses to be written to a memory in free-form text at 1126. If the user responds in the affirmative at both 1120 and 1124, the process 1100 may end at 1144.

At 1128, the user may be asked to indicate whether or not she has any type of peripheral vascular disease. Upon receiving the user's response, the process 1100 may cause details of the user's responses to be written to a memory in free-form text at 1130. If the user responds in the affirmative at any of 1120, 1124, or 1128, the process 1100 may end at 1144.

At 1132, the user may be asked to indicate whether or not she has any type of neuropathy at 1132. Upon receiving the user's response, the process 1100 may cause details of the user's responses to be written to a memory in free-form text at 1134. If the user responds in the affirmative to two or more of 1120, 1124, 1128, or 1132, then the process may end at 1144.

At 1136, the user may be asked to indicate details of her current treatment and/or medication. Upon receiving the user's response, the process 1100 may cause details of the user's responses to be written to a memory in free-form text at 1138. At 1140, the user may be asked to indicate when her diabetes was diagnosed. Upon receiving the user's response, the process 1100 may cause details of the user's responses to be written to a memory in free-form text at 1142. The process may end at 1144.

Figure 12:
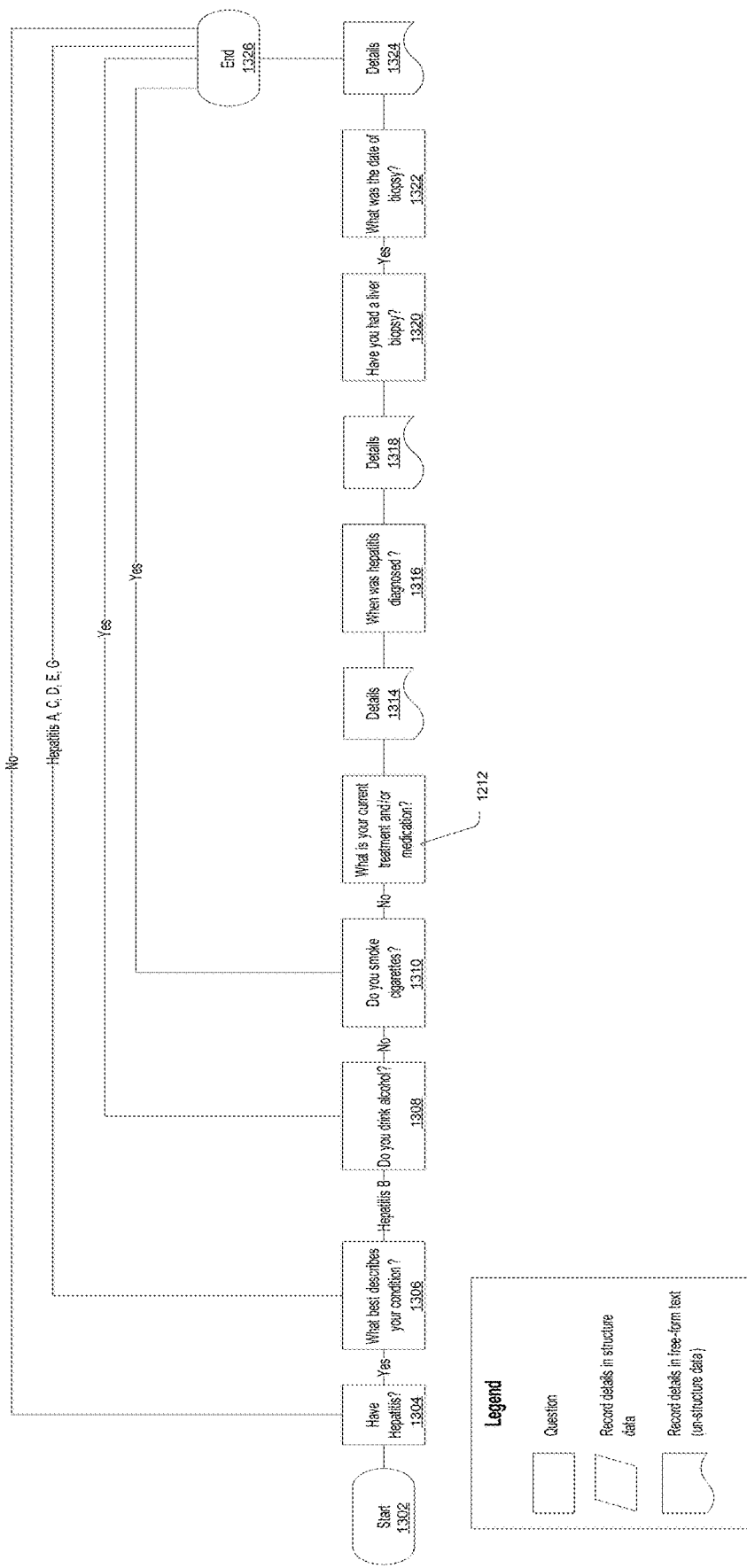
FIG. 12 is a process diagram depicting a logic flow governing the automatic determination of next queries to be posed to a user undergoing a Hepatitis focused medical history questionnaire based on the user's responses to previous queries, according to some embodiments.

Referring now to FIG. 12 there is provided a process diagram depicting a logic flow governing the automatic determination of next queries to be posed to a user undergoing a Hepatitis focused medical history questionnaire based on the user's responses to previous queries, according to some embodiments. At 1204, the user may be asked to indicate whether she has hepatitis. If the user responds in the negative, the process 1200 may end at 1226. If the user responds in the affirmative, the process may proceed to 1206.

At 1206, the user may be asked to indicate which interface element representing selection options (e.g., hepatitis a, b, c, d, e, or g) best describes her condition. If the user responds hepatitis a, c, d, e, or g, the process 1200 may end at 1226. If the user's response at 1206 indicates hepatitis b, the process may proceed to 1208.

At 1208, the user may be asked to indicate whether or not she drinks alcohol. If the responds to the question in the affirmative, the process 1200 may end at 1144. If the user responds to the question in the negative, the process 1200 may proceed to 1210. At 1210, the user may be asked to indicate whether or not she smokes cigarettes. If the user responds to the question in the affirmative, the process 1200 may end at 1144. If the user responds in the negative, the process 1200 may proceed to 1212.

At 1212, the user may be asked to indicate details of her current treatment and/or medication. Upon receiving the user's response, the process includes causing details of the user's responses to be written to a memory in free-form text at 1214. At 1216, the user may be asked to indicate when her hepatitis was diagnosed. Upon receiving the user's response, the process includes causing details of the user's responses to be written to a memory in free-form text at 1218.

At 1220, the user may be asked to indicate whether or not she has had a liver biopsy. At 1222, the user may be asked to indicate the date of the biopsy or biopsies. Upon receiving the user's response, the process 1200 may cause details of the user's responses to be written to a memory in free-form text at 1224. The process may end at 1226.

Figure 13:
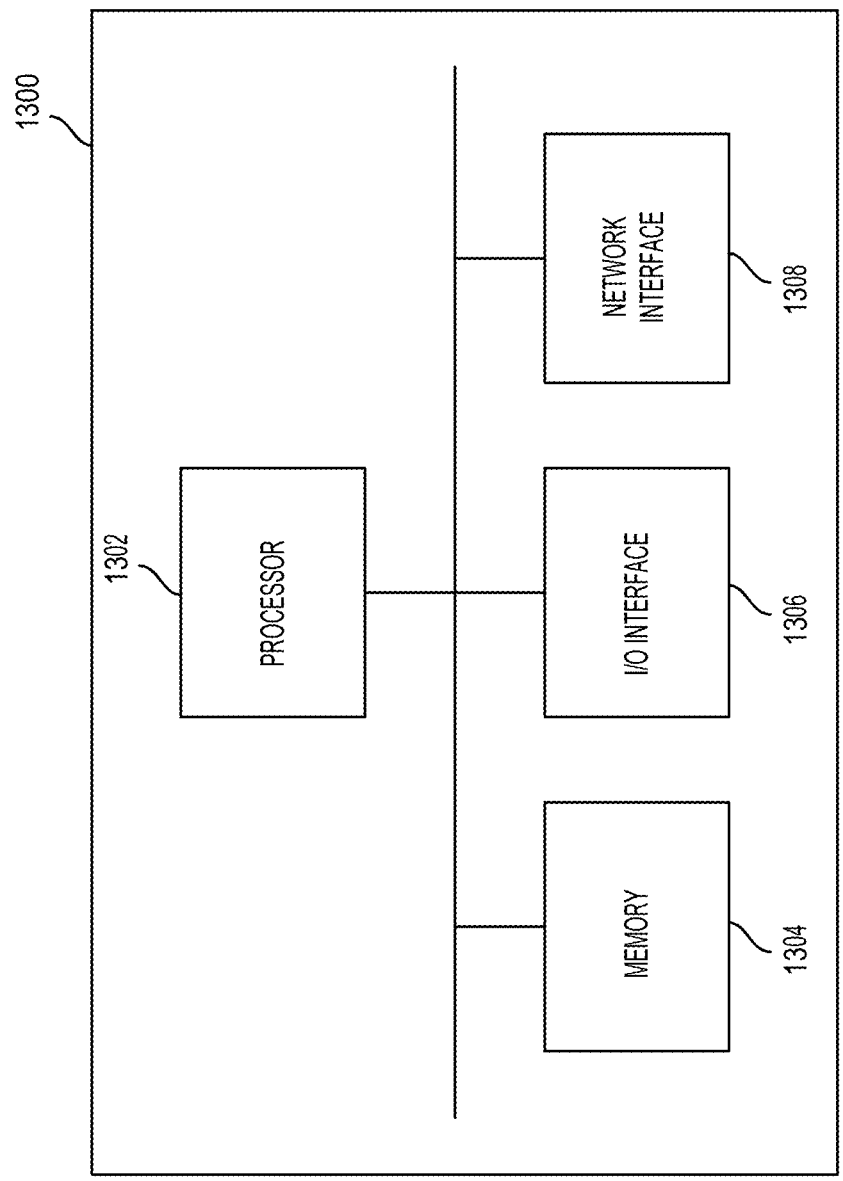
FIG. 13 is a schematic drawing of a computing device, according to some embodiments.

Referring now to FIG. 13 there is provided a schematic diagram of computing device 1300, exemplary of an embodiment. As depicted, computing device 1300 includes at least one processor 1302, memory 1304, at least one I/O interface 1306, and at least one network interface 1308. The computing device 1300 is configured as a tool for automatically generating and revising risk assessment queries, and for prompting, receiving, and processing responses to risk assessment queries in order to produce risk mitigation plan recommendations.

Each processor 1302 may be a microprocessor or microcontroller, a digital signal processing (DSP) processor, an integrated circuit, a field programmable gate array (FPGA), a reconfigurable processor, a programmable read-only memory (PROM). The processor 1302 may be optimized for analyzing text or verbal responses to queries from clients, determining the optimal next query to transmit to users based on previous responses and the totality of information required, and transmitting the optimal next question to the user.

Memory 1304 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 1306 enables computing device 1300 to interconnect with one or more input devices, such as a keyboard, mouse, camera, touch screen and a microphone, or with one or more output devices such as a display screen and a speaker. I/O interface 1306 may also include application programming interfaces (APIs) which are configured to receive data sets in the form of information signals, including verbal communications recorded and digitized, and/or text input from users in response to queries posed to said users.

Each network interface 1308 enables computing device 1300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others. Network interface 1308, for example, may be used to communicate audio files (e.g., MP3, WAV, etc.) containing recorded verbal responses from a user device to the system for processing via a speech-to-text engine.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Figure 14:
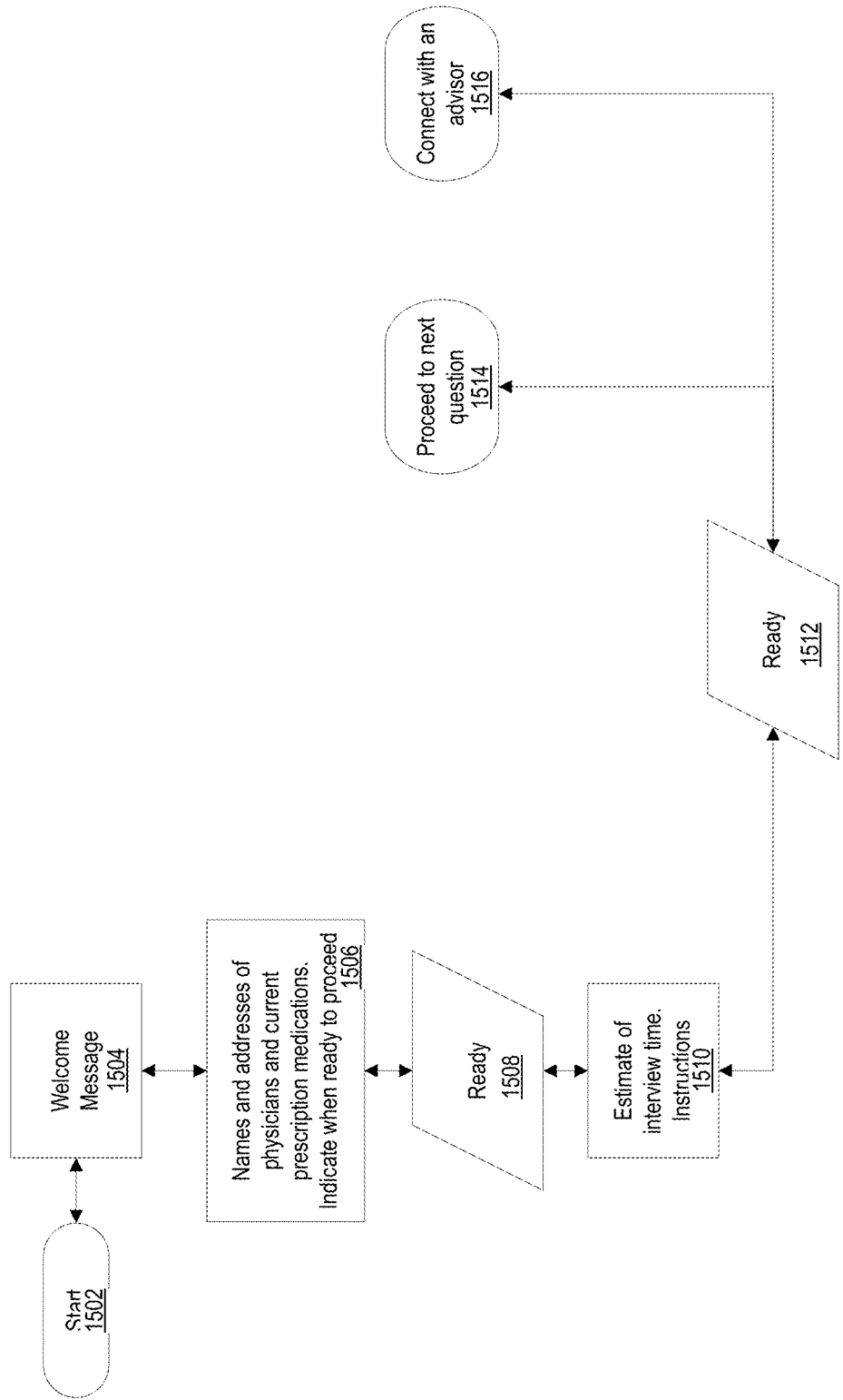
FIG. 14 is a process diagram for an example method of the system configured for generating automated conversation in relation to a healthcare questionnaire, according to some embodiments.

FIG. 14 is a process example for an example method of the system configured for generating automated conversation in relation to a healthcare questionnaire, according to some embodiments.

In this example, the system operates in a feedback loop starting at an initialization step 1502, where a welcome message is shown to the user at 1504. The names and addresses of physicians and medications is obtained such that the system can be properly primed and populated with question trees and flow at step 1508. At step 1510, a dynamic estimate of the interview time based on the instructions is generated, and tracked by the system in relation to one or more proposed pathways through question trees, and the system is designed to be ready at 1512. The system is utilized to at step 1514 to control the selective traversal of conversation tree paths based on contextual information estimated, using machine learning techniques, based on responses received from the users. The context information, for example, may include active aspects, such as clarification questions posed by the user, responses given that lead the conversation down a particular conversation pathway (e.g., user indicates that the user has loss of feeling in extremities, which is indicative but not definitive of acute diabetes complications), and passive aspects, such as a type of device being used, a type of device that is resuming a stopped process, or tracked profile information. At step 1516, the system may be configured to re-route the user to connect with an advisor, in certain situations. For example, the user may be so frustrated with the system (e.g., by way of the tracked conversation tones or non-compliance with response input types) that the system identifies that it may need to connect with the human user.

Throughout the present disclosure, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product or hardware appliance. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer system for dynamically determining, from a set of question data objects, a next best question data object for presentment to a user, the computer system comprising:
    a first data storage configured to store one or more data structures representative of a decision tree learning network maintaining one or more interconnected computing units representing at least: (i) a first set of features representative of one or more observed characteristics of a computing platform or a network connection being used by the user; (ii) a second set of features representative of an estimated current intent, mental state or disposition of the user; and (iii) a third set of features representative of information retrieved from a stored profile of the user;
    a second data storage configured to maintain the stored profile of the user, the profile including at least one or more data fields that are updated as new elements of information are received from the user;
    a processor configured to:
        train the network using a set of historical training data from previous recordings of interviews to establish weighted interconnections between the one or more interconnected computing units, wherein the set of historical training data is used to adjust a probability ranking at each node is adjusted based on a frequency of a path taken in the set of historical training data;
        monitor the one or more observed characteristics of the computing platform or the network connection being used by the user in provisioning of an incoming answer string and update the first set of features based on the one or more observed characteristics;
        parse the incoming answer string from the user into one or more string tokens, and using a natural language processing engine, process the one or more string tokens to estimate the current intent, mental state or disposition of the user and to update the second set of features;
        process the one or more string tokens to extract the new elements of information from the incoming answer string;
        process each question data object from the set of question data objects through the network to establish a match score for each question data object; and
        select the next best question data object from the set of question data objects based at least on the match score corresponding to each question data object.

2. The computer system of claim 1, wherein the set of question data objects includes parent question data objects and child question data objects, the child question data objects representing variant question data objects based at least upon a corresponding parent question data object.

3. The computer system of claim 1, wherein the set of question data objects are stored in a decision tree data structure representing a sequential flow of questions and including variant question data objects available one or more junctions of the decision tree data structure, and the processor is configured to iteratively determine the next best question data object for presentment to the user until the decision tree data structure is traversed to a terminal node of the decision tree data structure; and
    wherein only the question data objects available as variant question data objects at a present junction of the decision tree data structure are presented to the network for determination of the next best question data object.

4. The computer system of claim 3, wherein the variant question data objects include one or more dynamic question branches which invoke at least controlling a rendering of one or more dynamic interface objects for presentment to the user through a user interface.

5. The computer system of claim 3, wherein the processor is configured to modify the decision tree data structure to mark one or more junctions to be bypassed responsive to updates to the stored profile of the user as the one or more data fields are updated as the new elements of information are received from the user.

6. The computer system of claim 3, wherein the processor is configured to process the incoming answer string to determine a score of the incoming answer string indicative of a level of completeness between the incoming answer string and an underlying question the incoming answer string is being provided as a response.

7. The computer system of claim 6, wherein the processor is configured to transition to a next junction of the decision tree data structure only if the score indicative of the level of completeness is greater than a predefined threshold.

8. The computer system of claim 6, wherein the processor is configured to modify the decision tree data structure to reinsert a junction associated with the underlying question if the level of completeness is less than a predefined threshold, the reinserted junction re-inserted prior to the terminal node of the decision tree data structure.

9. The computer system of claim 3, wherein the processor is further configured to:
   receive an interface command indicative of a suspension of the sequential flow of questions;
   generate a snapshot state data record representative of the second set of features, the third set of features, and a present juncture of the decision tree data structure being traversed by the user;
   receive an interface command indicative of a resumption of the sequential flow of questions;
   update the one or more observed characteristics of the computing platform or the network connection being used by the user on the resumption of the sequential flow of questions;
   re-process each question data object from the set of question data objects through the decision tree learning network to establish an updated match score for each question data object;
   re-select the next best question data object from the set of question data objects based at least on the updated match score corresponding to each question data object; and
   re-establish the sequential flow of questions on the computing platform or the network connection being used by the user on the resumption of the sequential flow of questions.

10. The computer system of claim 9, wherein the snapshot state data record further includes a data record of the weighted interconnections between the one or more interconnected computing units, and wherein the processor is further configured to reinitialize the decision tree learning network based upon the data record of the weighted interconnections between the one or more interconnected computing units.

11. A computer implemented method for dynamically determining, from a set of question data objects, a next best question data object for presentment to a user, the method performed by a computer processor, the method comprising:
   maintaining one or more data structures representative of a decision tree learning network storing one or more interconnected computing units representing at least:
   (i) a first set of features representative of one or more observed characteristics of a computing platform or a network connection being used by the user; (ii) a second set of features representative of an estimated current intent, mental state or disposition of the user; and (iii) a third set of features representative of information retrieved from a stored profile of the user;
   maintaining the stored profile of the user, the profile including at least one or more data fields that are updated as new elements of information are received from the user;
   training the network using a set of historical training data from previous recordings of interviews to establish weighted interconnections between the one or more interconnected computing units, the set of historical training data used to adjust a probability ranking at each node is adjusted based on a frequency of a path taken in the set of historical training data;
   monitoring the one or more observed characteristics of the computing platform or the network connection being used by the user in provisioning of an incoming answer string and update the first set of features based on the one or more observed characteristics;
   parsing the incoming answer string from the user into one or more string tokens, and using a natural language processing engine, processing the one or more string tokens to estimate the current intent, mental state or disposition of the user and to update the second set of features;
   processing the one or more string tokens to extract the new elements of information from the incoming answer string;
   processing each question data object from the set of question data objects through the network to establish a match score for each question data object; and
   selecting the next best question data object from the set of question data objects based at least on the match score corresponding to each question data object.

12. The method of claim 11, wherein the set of question data objects includes parent question data objects and child question data objects, the child question data objects representing variant question data objects based at least upon a corresponding parent question data object.

13. The method of claim 11, wherein the set of question data objects are stored in a decision tree data structure representing a sequential flow of questions and including variant question data objects available one or more junctions of the decision tree data structure, and the processor is configured to iteratively determine the next best question data object for presentment to the user until the decision tree data structure is traversed to a terminal node of the decision tree data structure; and
   wherein only the question data objects available as variant question data objects at a present junction of the decision tree data structure are presented to the network for determination of the next best question data object.

14. The method of claim 13, wherein the variant question data objects include one or more dynamic question branches which invoke at least controlling a rendering of one or more dynamic interface objects for presentment to the user through a user interface.

15. The method of claim 13, comprising modifying the decision tree data structure to mark one or more junctions to be bypassed responsive to updates to the stored profile of the user as the one or more data fields are updated as the new elements of information are received from the user.

16. The method of claim 13, comprising processing the incoming answer string to determine a score of the incoming answer string indicative of a level of completeness between the incoming answer string and an underlying question the incoming answer string is being provided as a response.

17. The method of claim 16, comprising transitioning to a next junction of the decision tree data structure only if the score indicative of the level of completeness is greater than a predefined threshold.

18. The method of claim 13, comprising:
   receiving an interface command indicative of a suspension of the sequential flow of questions;
   generating a snapshot state data record representative of the second set of features, the third set of features, and a present juncture of the decision tree data structure being traversed by the user;
   receiving an interface command indicative of a resumption of the sequential flow of questions;

updating the one or more observed characteristics of the computing platform or the network connection being used by the user on the resumption of the sequential flow of questions;

re-processing each question data object from the set of question data objects through the decision tree learning network to establish an updated match score for each question data object;

re-selecting the next best question data object from the set of question data objects based at least on the updated match score corresponding to each question data object; and re-establishing the sequential flow of questions on the computing platform or the network connection being used by the user on the resumption of the sequential flow of questions.

19. The method of claim 18, wherein the snapshot state data record further includes a data record of the weighted interconnections between the one or more interconnected computing units, and wherein the method further comprises reinitializing the decision tree learning network based upon the data record of the weighted interconnections between the one or more interconnected computing units.

20. A non-transitory computer readable medium storing machine interpretable instructions, which when executed by a computer processor, cause the computer processor to perform steps of a comprising:

maintaining one or more data structures representative of a decision tree learning network storing one or more interconnected computing units representing at least: (i) a first set of features representative of one or more observed characteristics of a computing platform or a network connection being used by the user; (ii) a second set of features representative of an estimated current intent, mental state or disposition of the user; and (iii) a third set of features representative of information retrieved from a stored profile of the user;

maintaining the stored profile of the user, the profile including at least one or more data fields that are updated as new elements of information are received from the user;

training the network using a set of historical training data from previous recordings of interviews to establish weighted interconnections between the one or more interconnected computing units, the set of historical training data used to adjust a probability ranking at each node is adjusted based on a frequency of a path taken in the set of historical training data;

monitoring the one or more observed characteristics of the computing platform or the network connection being used by the user in provisioning of an incoming answer string and update the first set of features based on the one or more observed characteristics;

parsing the incoming answer string from the user into one or more string tokens, and using a natural language processing engine, processing the one or more string tokens to estimate the current intent, mental state or disposition of the user and to update the second set of features;

processing the one or more string tokens to extract the new elements of information from the incoming answer string;

processing each question data object from the set of question data objects through the network to establish a match score for each question data object; and selecting the next best question data object from the set of question data objects based at least on the match score corresponding to each question data object.

\* \* \* \* \*